（12）United States Patent
Akanuma et al.

(10) Patent No.: US 10,805,597 B2
(45) Date of Patent: Oct. 13, 2020

(54) TERMINAL DEVICE, CONTROL DEVICE, DATA-INTEGRATING DEVICE, WORK VEHICLE, IMAGE-CAPTURING SYSTEM, AND IMAGE-CAPTURING METHOD

(71) Applicant: Komatsu Ltd., Tokyo (JP)

(72) Inventors: Hiroki Akanuma, Tokyo (JP); Yuuichi Nemoto, Tokyo (JP); Masato Seino, Tokyo (JP); Hiroyoshi Yamaguchi, Hiratsuka (JP); Shun Kawamoto, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/069,573

(22) PCT Filed: Mar. 8, 2017

(86) PCT No.: PCT/JP2017/009287
§ 371 (c)(1),
(2) Date: Jul. 12, 2018

(87) PCT Pub. No.: WO2017/169598
PCT Pub. Date: Oct. 5, 2017

(65) Prior Publication Data
US 2019/0020867 A1    Jan. 17, 2019

(30) Foreign Application Priority Data

Mar. 30, 2016    (JP) .................................. 2016-069691
Oct. 31, 2016    (JP) .................................. 2016-213793

(51) Int. Cl.
*H04N 13/296*    (2018.01)
*E02F 9/26*    (2006.01)
(Continued)

(52) U.S. Cl.
CPC ............. *H04N 13/296* (2018.05); *B60R 1/00* (2013.01); *E02F 9/2054* (2013.01); *E02F 9/26* (2013.01);
(Continued)

(58) Field of Classification Search
CPC .. H04N 13/296; H04N 13/194; H04N 5/2258; H04N 5/23222; H04N 5/23293;
(Continued)

(56) References Cited

U.S. PATENT DOCUMENTS

2015/0206016 A1    7/2015    Chiu et al.

FOREIGN PATENT DOCUMENTS

| CN | 203086581 U | 7/2013 |
| CN | 103236160 A | 8/2013 |

(Continued)

*Primary Examiner* — Masum Billah
*Assistant Examiner* — Hesham K Abouzahra
(74) *Attorney, Agent, or Firm* — Locke Lord LLP

(57) ABSTRACT

A capture data-receiving unit receiving first capture data captured by an image-capturing device, which is included in a work vehicle, capable of generating three-dimensional data, a display unit displaying the first capture data received by the capture data-receiving unit, and an acquisition instruction-transmitting unit transmitting an acquisition instruction for causing the work vehicle to acquire second capture data captured by the image-capturing device and used for generation of three-dimensional data are included.

20 Claims, 22 Drawing Sheets

(51) Int. Cl.
*G01C 11/06* (2006.01)
*H04N 5/225* (2006.01)
*H04N 5/232* (2006.01)
*H04N 7/18* (2006.01)
*E02F 9/20* (2006.01)
*H04N 13/194* (2018.01)
*B60R 1/00* (2006.01)
*H04N 13/207* (2018.01)
*H04N 13/282* (2018.01)

(52) U.S. Cl.
CPC ............ *G01C 11/06* (2013.01); *H04N 5/2258* (2013.01); *H04N 5/23222* (2013.01); *H04N 5/23293* (2013.01); *H04N 7/181* (2013.01); *H04N 7/183* (2013.01); *H04N 13/194* (2018.05); *B60R 2300/105* (2013.01); *B60R 2300/107* (2013.01); *B60R 2300/20* (2013.01); *B60R 2300/303* (2013.01); *B60R 2300/50* (2013.01); *H04N 13/207* (2018.05); *H04N 13/282* (2018.05)

(58) Field of Classification Search
CPC ......... H04N 7/181; B60R 1/00; E02F 9/2054; E02F 9/26; G01C 11/06
See application file for complete search history.

(56) References Cited

FOREIGN PATENT DOCUMENTS

| | | | |
|---|---|---|---|
| JP | 10-072851 A | | 3/1998 |
| JP | 2003-040081 A | | 2/2003 |
| JP | 2003040081 A | * | 2/2003 |
| JP | 2003-284096 A | | 10/2003 |
| JP | 2003284096 A | * | 10/2003 |
| JP | 2006-013851 A | | 1/2006 |
| JP | 2007-142517 A | | 6/2007 |
| JP | 2009-193240 A | | 8/2009 |
| JP | 2009193240 A | * | 8/2009 |
| JP | 2010-060344 A | | 3/2010 |
| JP | 2011-099779 A | | 5/2011 |
| JP | 2013-036243 A | | 2/2013 |
| JP | 2013036243 A | * | 2/2013 |
| JP | 2014-123208 A | | 7/2014 |
| JP | 2015-164847 A | | 9/2015 |

* cited by examiner

TERMINAL DEVICE, CONTROL DEVICE, DATA-INTEGRATING DEVICE, WORK VEHICLE, IMAGE-CAPTURING SYSTEM, AND IMAGE-CAPTURING METHOD

TECHNICAL FIELD

The present invention relates to a terminal device, a control device, a data-integrating device, a work vehicle, an image-capturing system, and an image-capturing method.

Priority is claimed on Japanese Patent Application No. 2016-069691, filed on Mar. 30, 2016, and Japanese Patent Application No. 2016-213793, filed on Oct. 31, 2016, the contents of which are incorporated herein by reference.

BACKGROUND ART

As disclosed in Patent Literature 1, a technology of acquiring image data of a construction site using a stereo camera included in a construction machine is known.

CITATION LIST

Patent Literature

[Patent Literature 1]
Japanese Unexamined Patent Application, First Publication No. 2013-036243

SUMMARY OF INVENTION

Technical Problem

As an image-capturing device capable of generating three-dimensional data, a stereo camera is known. A technology of generating three-dimensional data using capture data captured by a stereo camera is known. By generating three-dimensional data of the topography of a construction site using capture data acquired by imaging the topography of the construction site by mounting a stereo camera in a construction machine, progress management of the construction site can be performed. At that time, a visual line of an operator of the construction machine and a visual line of an image-capturing device do not necessarily coincide with each other. In addition, there is also concern that there may be a difference between a capture range imaged by a photographer and a capture range of an image-capturing device. The photographer, for example, may be an operator of a construction machine in which a stereo camera is mounted. Thus, there is a possibility that capture data captured in accordance with an operator's instruction may not be acquired by imaging a desired place.

An object of the present invention is to provide a terminal device, a control device, a data-integrating device, a work vehicle, an image-capturing system, and an image-capturing method capable of generating three-dimensional data relating to a desired place.

Solution to Problem

According to a first aspect of the present invention, a terminal device includes: a capture data-receiving unit receiving first capture data captured by an image-capturing device, which is included in a work vehicle, capable of generating three-dimensional data; a display unit displaying the first capture data received by the capture data-receiving unit; and an acquisition instruction-transmitting unit transmitting an acquisition instruction for causing the work vehicle to acquire second capture data captured by the image-capturing device and used for generation of three-dimensional data.

According to a second aspect of the present invention, an image-capturing system includes: a work vehicle; and a terminal device. The work vehicle includes: a vehicle body; an image-capturing device included in the vehicle body and being capable of acquiring information of a depth direction; a capture data-transmitting unit transmitting first capture data captured by the image-capturing device to the terminal device; an acquisition instruction-receiving unit receiving an acquisition instruction of second capture data used for generation of three-dimensional data; and a capture data-acquiring unit acquiring the second capture data from the image-capturing device in accordance with the acquisition instruction, and the terminal device includes: a capture data-receiving unit receiving the first capture data from the work vehicle; a display unit displaying the first capture data received by the capture data-receiving unit; and an acquisition instruction-transmitting unit transmitting an acquisition instruction for causing the work vehicle to acquire the second capture data.

According to a third aspect of the present invention, an image-capturing method includes: receiving first capture data captured by an image-capturing device included in a work vehicle and being capable of acquiring information of a depth direction; displaying the received first capture data in a terminal device; and transmitting an acquisition instruction causing the work vehicle to acquire second capture data captured by the image-capturing device and used for generation of three-dimensional data.

According to a fourth aspect of the present invention, a control device includes: a capture data-transmitting unit transmitting first capture data captured by an image-capturing device included in a work vehicle and being capable of acquiring information of a depth direction to a terminal device; an acquisition instruction-receiving unit receiving an acquisition instruction of second capture data used for generation of three-dimensional data; and a capture data-acquiring unit acquiring the second capture data from the image-capturing device in accordance with the acquisition instruction.

According to a fifth aspect of the present invention, a data-integrating device includes: a three-dimensional data-acquiring unit acquiring a plurality of pieces of three-dimensional data generated on the basis of capture data acquired by performing image-capturing of a construction site using an image-capturing device, which is included in a work vehicle, capable of acquiring information of a depth direction; and a three-dimensional data-integrating unit generating integrated three-dimensional data by integrating the plurality of pieces of three-dimensional data acquired by the three-dimensional data-acquiring unit.

According to a sixth aspect of the present invention, a work vehicle includes: a vehicle body; an image-capturing device included in the vehicle body; a three-dimensional data-generating unit generating a plurality of pieces of three-dimensional data on the basis of a plurality of pieces of capture data captured by the image-capturing device; and a three-dimensional data-integrating unit generating integrated three-dimensional data by integrating a plurality of pieces of three-dimensional data generated by the three-dimensional data-generating unit.

According to a seventh aspect of the present invention, an image-capturing system includes: a work vehicle; and a data-integrating device. The work vehicle includes: a vehicle body; an image-capturing device included in the vehicle body; a three-dimensional data-generating unit generating a plurality of pieces of three-dimensional data on the basis of a plurality of pieces of capture data captured by the image-capturing device; and a data-transmitting unit transmitting the plurality of pieces of three-dimensional data to the data-integrating device, and the data-integrating device includes: a data-receiving unit receiving the plurality of pieces of three-dimensional data from the work vehicle; and a three-dimensional data-integrating unit generating integrated three-dimensional data by integrating the plurality of pieces of three-dimensional data received by the data-receiving unit.

Advantageous Effects of Invention

According to at least one aspect among the aspects described above, a terminal device, a control device, a data-integrating device, a work vehicle, an image-capturing system, and an image-capturing method capable of generating three-dimensional data relating to a desired place are provided.

DESCRIPTION OF EMBODIMENTS

First Embodiment

<<Construction Management System>>

Figure 1:
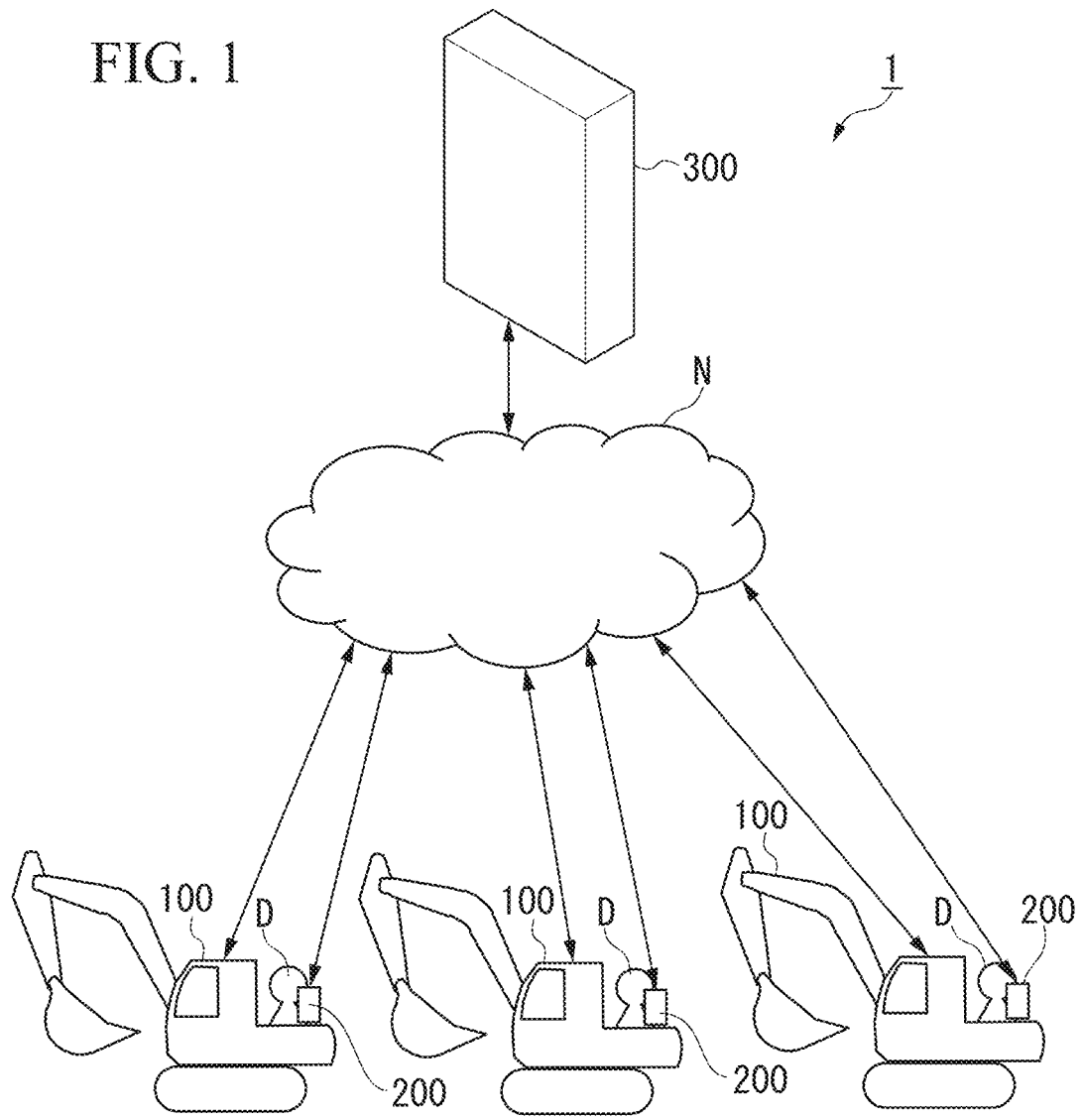
FIG. 1 is a schematic diagram illustrating the configuration of a construction management system according to a first embodiment.

FIG. 1 is a schematic diagram illustrating the configuration of a construction management system according to a first embodiment.

The construction management system 1 includes: a plurality of construction machines 100, a plurality of terminal devices 200; and a server device 300. Although FIG. 1 illustrates the construction management system 1 including the plurality of construction machines 100 and the plurality of terminal devices 200, the construction management system 1 may include one construction machine 100 and a plurality of terminal devices 200 or a plurality of terminal devices 200 and one terminal device 200. In addition, the construction management system 1 may include one construction machine 100 and one terminal device 200. The construction management system 1 is a system that manages the progress status of construction using the construction machine 100 or manpower. More specifically, the construction management system 1 generates three-dimensional data of a construction site from capture data captured by a stereo camera included in the construction machine 100. The construction management system 1 is one example of an image-capturing system. A driver D of the construction machine 100 is a photographer who can operate the terminal device 200.

A control device 126, which will be described later, included in the construction machine 100 receives an instruction from the terminal device 200 and performs image capturing using a stereo camera in accordance with the instruction. The control device 126 of the construction machine 100 generates three-dimensional data from capture data captured by the stereo camera. Examples of the three-dimensional data include point-group data, polygon data, and voxel data. The construction machine 100 according to the first embodiment is a hydraulic shovel as a work vehicle.

As the terminal device 200, for example, a mobile phone, a smartphone, or a portable computer may be used. The terminal device 200 displays capture data (first capture data) acquired using a first camera 1251 to be described later among stereo cameras 125 included in the construction machine 100. The terminal device 200 transmits an acquisition instruction for acquiring capture data (second capture data) used for generation of three-dimensional data to the construction machine 100 in accordance with an operator's input. The second capture data is capture data that is captured by all the cameras (a first camera 1251, a second camera 1252, a third camera 1253, and a fourth camera 1254) of stereo cameras 125 to be described later. The second capture data may either include the first capture data acquired in the past or not include the first capture data acquired in the past. In other words, in a case in which the second capture data includes first capture data acquired in the past, second capture data that is the second capture data acquired at the same timing and includes the first capture data may be stored in a storage unit, which is not illustrated in the drawing, of the control device 126 to be described later, and three-dimensional data may be generated using such capture data. On the other hand, in a case in which second capture data does not include the first capture data acquired in the past, as will be described later, by using second capture data including first capture data other than first capture data used by a photographer for checking a capture range and a capture content of the stereo camera 125, three-dimensional data may be generated.

The server device 300 receives the capture data and the three-dimensional data from the construction machine 100.

The server device 300 can generate integrating three-dimensional data representing the whole construction site by integrating a plurality of pieces of three-dimensional data.

The construction machines 100, the terminal devices 200, and the server devices 300 are interconnected through a network N. Here, the network N includes a mobile communication network or a satellite communication network.

<<Construction Machine>>

Figure 2:
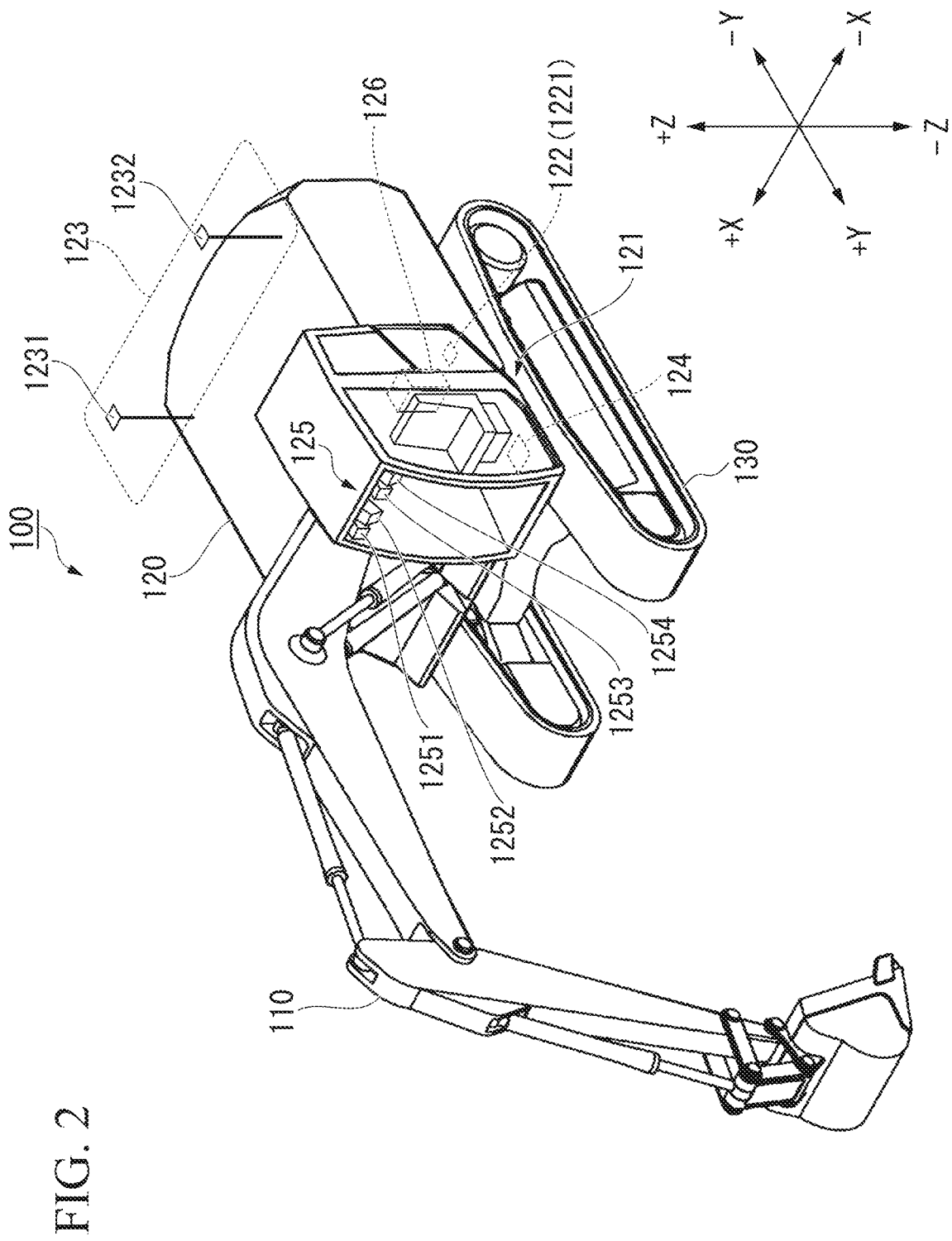
FIG. 2 is a perspective view illustrating the configuration of a construction machine according to the first embodiment.

FIG. 2 is a perspective view illustrating the configuration of the construction machine according to the first embodiment.

The construction machine 100 includes: a work equipment 110 operating using oil pressure; a vehicle body 120 as an upper revolving body supporting the work equipment 110; and a running device 130 as a lower running body supporting the vehicle body 120.

The vehicle body 120 includes: a driving compartment 121 that a driver D boards; a position detector 122 that detects the position of the vehicle body 120; an azimuth detector 123 that detects an azimuth in which the vehicle body 120 is directed; a posture detector 124 that detects a posture of the vehicle body 120; a stereo camera 125 that performs image capturing of the side in front (+Y direction) of the vehicle body 120; and a control device 126 that controls the construction machine 100. In addition, the azimuth detector 123 functions also as a part of the position detector detecting the position of the vehicle body 120. The driving compartment 121 is installed on the side in front (+Y direction) of the vehicle body 120 and on the left side (−X side) of the work equipment 110.

The position detector 122 includes a first receiver 1221 that receives positioning signals from satellites configuring a global navigation satellite system (GNSS). The position detector 122, for example, detects an installation position of the first receiver 1221 on the basis of positioning signals received by the first receiver 1221 through a second receiver 1231 and a third receiver 1232 that are antennas. An example of the NSS includes a global positioning system (UPS).

The azimuth detector 123 includes a second receiver 1231 and a third receiver 1232 receiving positioning signals from the satellites configuring the NSS. The second receiver 1231 and the third receiver 1232 are installed at different positions in the vehicle body 120. The azimuth detector 123 detects the installation position of the second receiver 1231 on the basis of positioning signals received by the second receiver 1231. The azimuth detector 123 detects the installation position of the third receiver 1232 on the basis of positioning signals received by the third receiver 1232. The azimuth detector 123 detects an azimuth in which the vehicle body 120 is directed on the basis of the detected installation position of the second receiver 1231 and the detected installation position of the third receiver 1232.

The posture detector 124 measures an acceleration and angular velocity of the vehicle body 120 and detects the posture (for example, pitch, yaw, and roll) of the vehicle body 120 on the basis of a result of the measurement. The posture detector 124, for example, is installed on a lower surface of the driving compartment 121. The posture detector 124, for example, may use an inertial measurement unit (IMU) as an inertia-measuring device.

When a key switch not illustrated in the drawing is turned on, an engine, which is not illustrated in the drawing, mounted in the construction machine 100 starts to operate, and devices such as the control device 126 including the stereo camera 125 and the like are supplied with power from a battery not illustrated in the drawing and start to operate. The stereo cameras 125 are installed on the front side (+Y direction) and the upper side (+Z direction) inside the driving compartment 121. In other words, the viewpoint of the stereo camera 125 is higher than the viewpoint of the driver D. The stereo cameras 125 capture an image of the side in front of the driving compartment 121 through a front windshield disposed on the side in front of the driving compartment 121. The stereo cameras 125 include two pairs of cameras. In other words, the stereo cameras 125 include four cameras. More specifically, the stereo cameras 125 include a first camera 1251, a second camera 1252, a third camera 1253, and a fourth camera 1254 in order from the right side (+X side). The first camera 1251 and the third camera 1253 are cameras forming a pair. The first camera 1251 and the third camera 1253 are installed in a vehicle width direction with a space interposed therebetween such that the optical axes thereof are approximately parallel to the floor face of the driving compartment 121. The second camera 1252 and the fourth camera 1254 are cameras forming a pair. The second camera 1252 and the fourth camera 1254 are installed in the vehicle width direction with a space interposed therebetween such that the optical axes thereof are approximately parallel to each other, and the optical axes are inclined toward the lower direction (−Z direction) from the side in front (+Y direction) of the driving compartment 121 with respect to the floor face of the driving compartment 121. The stereo camera 125 is one example of an image-capturing device capable of generating three-dimensional data. In other words, the control device 126 can generate three-dimensional data from one pair of pieces of capture data captured by at least one of the stereo cameras 125. Here, "an image-capturing device capable of generating three-dimensional data" does not need to generate three-dimensional data itself but may capture capture data used for generation of three-dimensional data.

<<Control Device of Construction Machine>>

Figure 3:
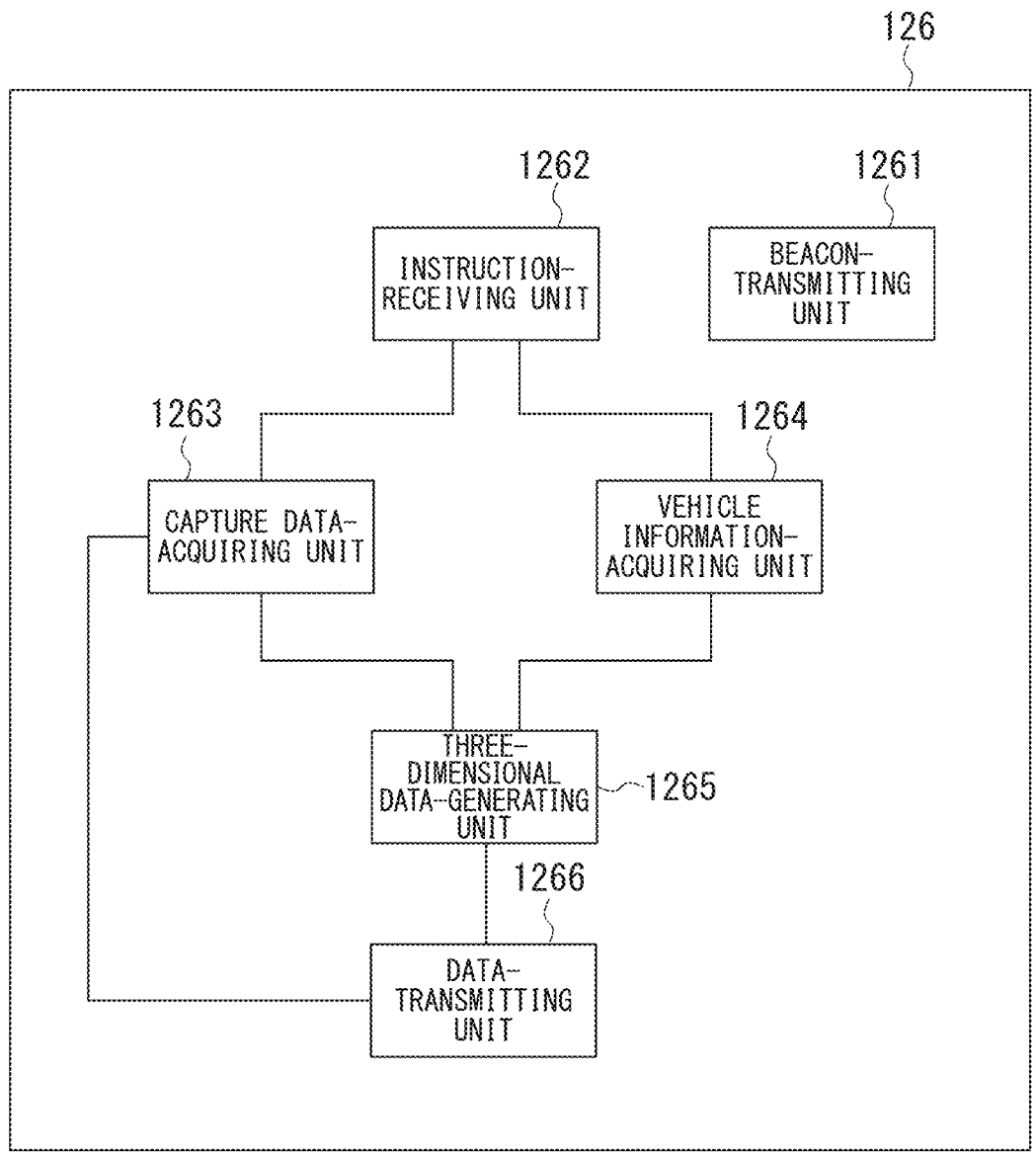
FIG. 3 is a block diagram illustrating the configuration of a control device of a construction machine according to the first embodiment.

FIG. 3 is a block diagram illustrating the configuration of the control device of the construction machine according to the first embodiment.

The control device 126 includes: a beacon-transmitting unit 1261; an instruction-receiving unit 1262; a capture data-acquiring unit 1263; a vehicle information-acquiring unit 1264; a three-dimensional data-generating unit 1265; and a data-transmitting unit 1266.

The beacon-transmitting unit 1261 transmits a beacon signal including a vehicle ID as vehicle identification information used for identifying the construction machine 100. A reaching distance of the beacon signal, for example, is about 50 meters. In addition, as a method of transmitting a vehicle ID, a communication form that can perform near-field communication may be used. Thus, instead of a beacon signal, for example, a signal relating to Bluetooth Low Energy (BLE; Bluetooth is a registered trademark) may be used.

The instruction-receiving unit 1262 receives a capture instruction from the server device 300. The capture instruction is transmitted from the terminal device 200 to the server device 300 and is transmitted by the server device 300 to the control device 126. In the capture instruction, a terminal ID as terminal identification information used for identifying a terminal device 200 that is a transmission source is included. An example of the terminal ID includes an IP address of the terminal device 200. The instruction-receiving unit 1262 receives an acquisition instruction for acquiring capture data (second capture data) used for generation of three-dimensional data from the server device 300. The instruction-receiving unit 1262 is one example of a capture instruction-receiving unit and an acquisition instruction-receiving unit.

When a capture instruction is received by the instruction-receiving unit 1262, the capture data-acquiring unit 1263 starts a process of acquiring capture data (first capture data) captured by the first camera 1251 from the stereo camera 125 at predetermined time intervals. For example, after the capture instruction is received, the capture data-acquiring unit 1263 may acquire first capture data every five seconds. When the instruction-receiving unit 1262 receives an acquisition instruction, the capture data-acquiring unit 1263 acquires capture data (second capture data) captured by each of the stereo cameras 125 (the first camera 1251, the second camera 1252, the third camera 1253, and the fourth camera 1254).

The vehicle information-acquiring unit 1264 acquires vehicle information such as position information, azimuth information, and posture information from the position detector 122, the azimuth detector 123, and the posture detector 124.

The three-dimensional data-generating unit 1265 generates three-dimensional data representing a range imaged by the stereo cameras 125 on the basis of the second capture data acquired by the capture data-acquiring unit 1263 and the information acquired by the vehicle information-acquiring unit 1264. More specifically, the three-dimensional data-generating unit 1265 generates three-dimensional data in the following order. The three-dimensional data-generating unit 1265 determines a position and a visual line direction in a global coordinate system of the stereo cameras 125 from the position information, the azimuth information, and the posture information acquired by the vehicle information-acquiring unit 1264. The three-dimensional data-generating unit 1265 generates three-dimensional data in a local coordinate system using the positions of the stereo cameras 125 as a reference from capture data captured by the first camera 1251 and the third camera 1253 using triangulation. The three-dimensional data-generating unit 1265 generates three-dimensional data in a local coordinate system using the positions of the stereo cameras 125 as a reference from a pair of pieces of capture data captured by the second camera 1252 and the fourth camera 1254 using triangulation. The three-dimensional data in the local coordinate system is three-dimensional data representing an overlapping range in a pair of pieces of capture data. The three-dimensional data-generating unit 1265, by applying the three-dimensional data in a local coordinate system to the positions and the visual line directions of the stereo cameras 125 in a global coordinate system, generates three-dimensional data representing ranges imaged by the stereo cameras 125.

The data-transmitting unit 1266 transmits the first capture data acquired by the capture data-acquiring unit 1263 to the server device 300. The first capture data is transmitted to the terminal device 200 by the server device 300. In addition, the data-transmitting unit 1266 transmits the three-dimensional data generated by the three-dimensional data-generating unit 1265 and the second capture data to the server device 300. The three-dimensional data and the second capture data are stored in the server device 300. The data-transmitting unit 1266 is one example of a capture data-transmitting unit.

<<Terminal Device>>

Figure 4:
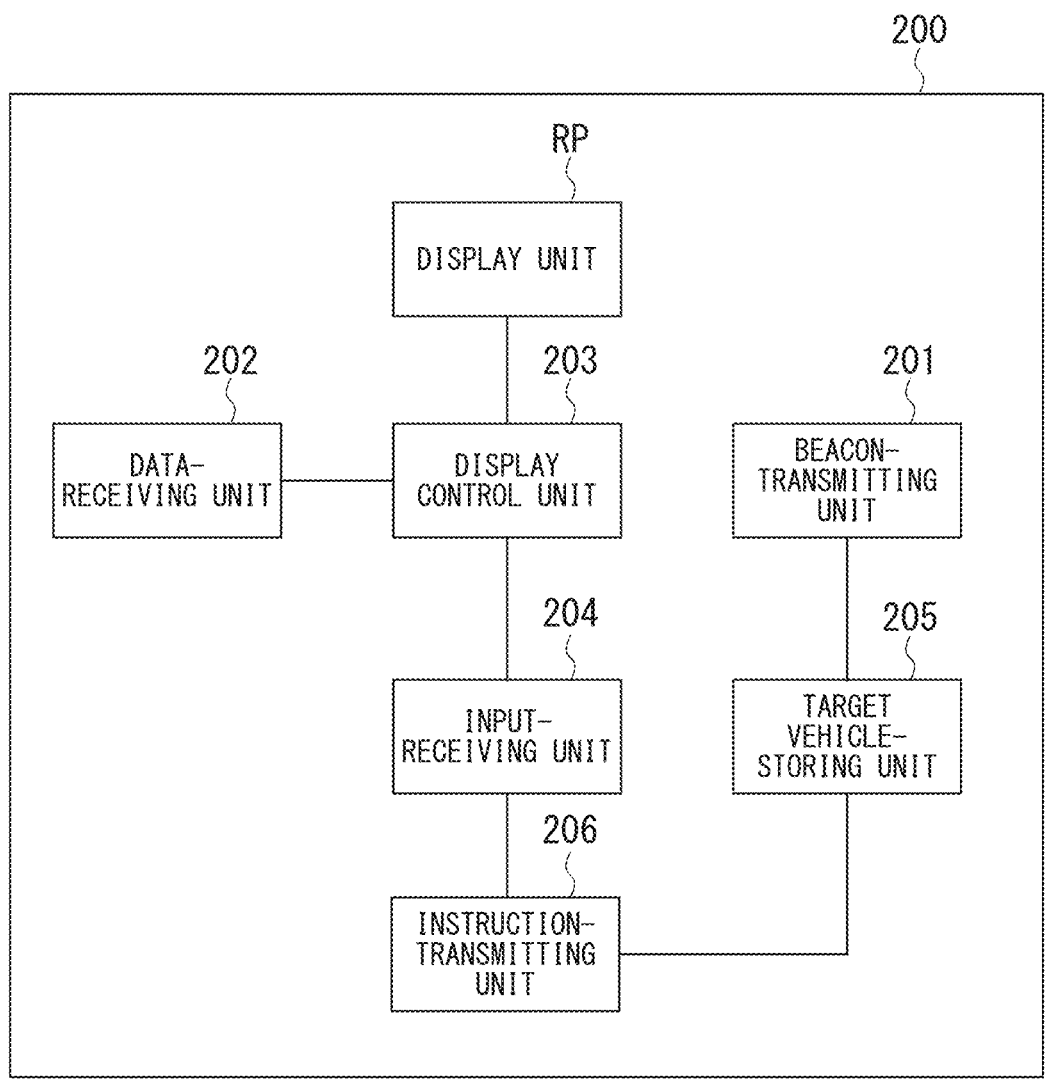
FIG. 4 is a block diagram illustrating the configuration of a terminal device according to the first embodiment.

FIG. 4 is a block diagram illustrating the configuration of the terminal device according to the first embodiment.

The terminal device 200 includes: a beacon-receiving unit 201; a data-receiving unit 202; a display control unit 203; an input-receiving unit 204; a target vehicle-storing unit 205; an instruction-transmitting unit 206; and a display unit RP.

The beacon-receiving unit 201 receives a beacon signal transmitted from the construction machine 100. The beacon-receiving unit 201 determines a construction machine 100 from a vehicle ID included in the beacon signal.

The data-receiving unit 202 receives capture data captured by stereo cameras 125 of the construction machine 100 or three-dimensional data representing a construction site from the server device 300. The data-receiving unit 202 is one example of a capture data-receiving unit and a three-dimensional data-receiving unit.

The display control unit 203 displays the received data on a display that is a display unit RP.

Examples of the display of the terminal device 200 include a touch panel, a liquid crystal display, and an organic electroluminescence (EL) display. More specifically, the display control unit 203 displays a list of vehicles represented by the vehicle ID received by the beacon-receiving unit 201, capture data captured by the stereo camera 125, or three-dimensional data representing a construction site on the display.

The input-receiving unit 204 accepts an input operation according to a display content according to the display control unit 203 from the driver D through an input device. Examples of the input device of the terminal device 200 include a touch panel, a button, and a keyboard. More specifically, the input-receiving unit 204 accepts inputs of transmission triggers of a capture instruction, an acquisition instruction, a transmission instruction, an integration instruction, and a reflection instruction. The input-receiving unit 204 is one example of an acquisition instruction-receiving unit. The capture instruction is an instruction for causing the control device 126 of the construction machine 100 to acquire capture data. The acquisition instruction is an instruction for causing the control device 126 of the construction machine 100 to acquire capture data used for generation of three-dimensional data. The transmission instruction is an instruction for causing the terminal device 200 to transmit capture data and three-dimensional data to the server device 300. The integration instruction is an instruction for causing the server device 300 to integrate a plurality of pieces of three-dimensional data into one piece of integrated three-dimensional data. The reflection instruction is an instruction for causing the server device 300 to compare one or a plurality of pieces of three-dimensional data with three-dimensional data of a completed form and reflecting a result of the comparison on information (construction progress information) representing a construction progress based on the result of the comparison. The three-dimensional data of the completed form is information representing a topography after completion of the construction of the construction site.

The target vehicle-storing unit 205 stores a vehicle ID of a construction machine 100 that is a destination of a capture instruction and the acquisition instruction.

The instruction-transmitting unit 206 transmits a capture instruction or an acquisition instruction for a construction machine 100 represented by a vehicle ID stored by the target vehicle-storing unit 205 to the server device 300 in accordance with a driver D's input. The capture instruction and the acquisition instruction are transmitted to the construction machine 100 by the server device 300. In other words, the instruction-transmitting unit 206 transmits a capture instruction and an acquisition instruction to a construction machine 100 represented by a vehicle ID stored by the target vehicle-storing unit 205 through the server device 300. The instruction-transmitting unit 206 transmits a transmission instruction for transmitting three-dimensional data or capture data to the server device 300 in accordance with a driver D's input. The instruction-transmitting unit 206 is one example of a capture instruction-transmitting unit and an acquisition instruction-transmitting unit.

The display unit RP is a display disposed in the terminal device 200. As the display unit RR a liquid crystal display (LCD) may be used.

<<Server Device>>

Figure 5:
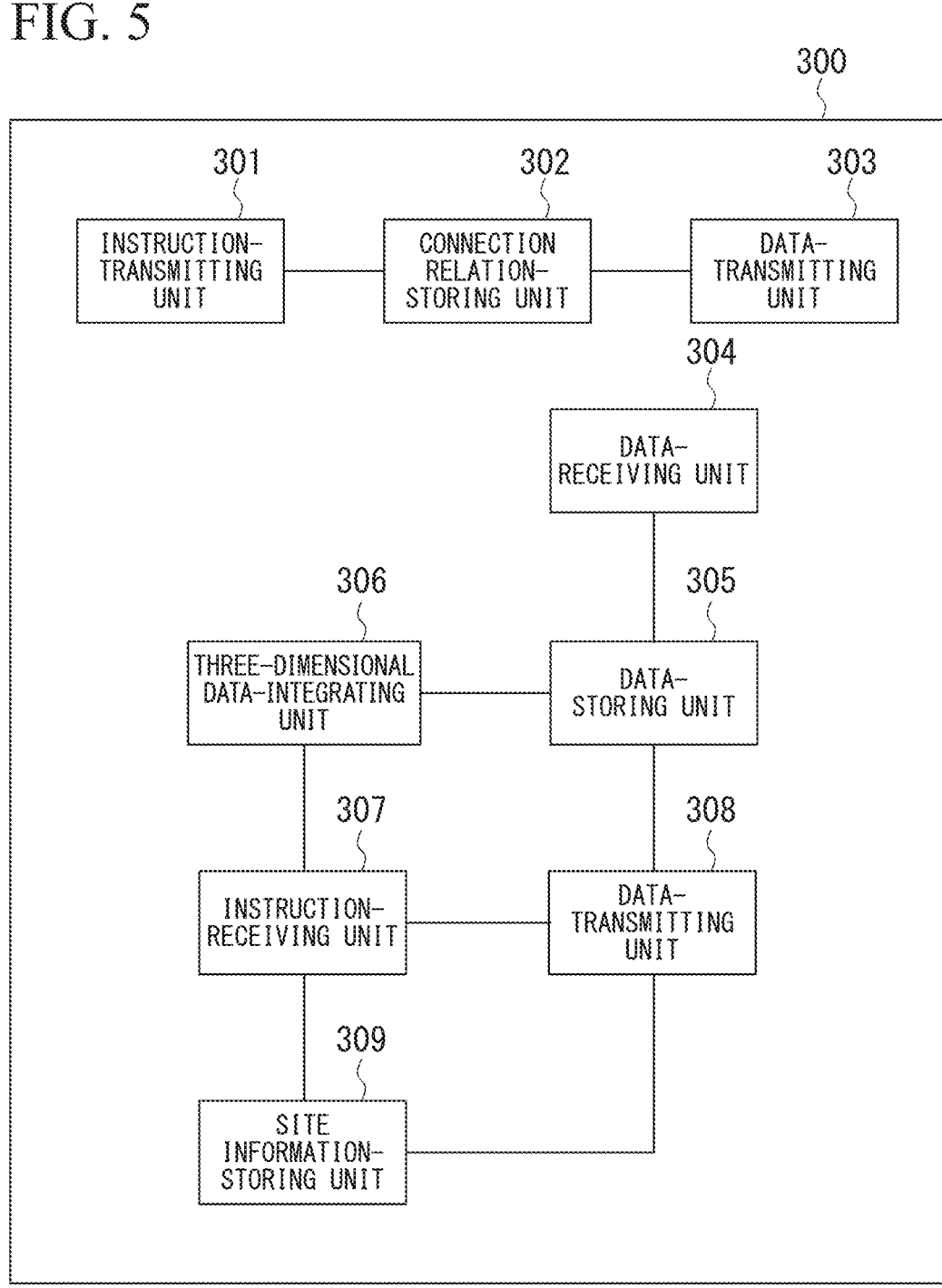
FIG. 5 is a block diagram illustrating the configuration of a server device according to the first embodiment.

FIG. 5 is a block diagram illustrating the configuration of the server device according to the first embodiment.

The server device 300 includes: an instruction-transmitting unit 301; a connection relation-storing unit 302; a data-transmitting unit 303; a data-receiving unit 304; a data-storing unit 305; a three-dimensional data-integrating unit 306; an instruction-receiving unit 307; a data-transmitting unit 308; and a site information-storing unit 309.

The instruction-transmitting unit 301 transmits a capture instruction or an acquisition instruction received from the terminal device 200 to a construction machine 100 represented by a vehicle ID included in the instruction. The instruction-transmitting unit 301 stores the vehicle ID included in the capture instruction and the terminal ID included in the capture instruction in the connection relation-storing unit 302 in association with each other.

The data-transmitting unit 303 transmits the capture data received from the construction machine 100 to the terminal device 200 represented by the terminal ID associated with the vehicle ID of the construction machine 100 in the connection relation-storing unit 302.

The data-receiving unit 304 receives three-dimensional data and capture data from the construction machine 100.

The data-storing unit 305 stores the three-dimensional data and the capture data received by the data-receiving unit 304 and the three-dimensional data representing the completed form. The data-storing unit 305 stores the three-dimensional data and the capture data in association with a vehicle ID used for identifying a construction machine 100 that is a generation source of such data.

The three-dimensional data-integrating unit 306 integrates two or more pieces of three-dimensional data stored by the data-storing unit 305 into one piece of three-dimensional data. The three-dimensional data-integrating unit 306 stores the integrated three-dimensional data in the data-storing unit 305. The server device 300 is one example of a data-integrating device.

The instruction-receiving unit 307 receives a transmission instruction of three-dimensional data or capture data from the terminal device 200.

The data-transmitting unit 308, on the basis of a transmission instruction received by the instruction-receiving unit 307, transmits three-dimensional data or capture data stored by the data-storing unit 305 to the terminal device 200 that is a transmission source of the transmission instruction.

The site information-storing unit 309 stores a vehicle ID used for identifying a construction machine 100 performing work at the construction site in association with a site ID used for identifying a construction site.

<<Operation>>

Here, an image-capturing method using the construction management system 1 according to the first embodiment will be described.

Figure 6:
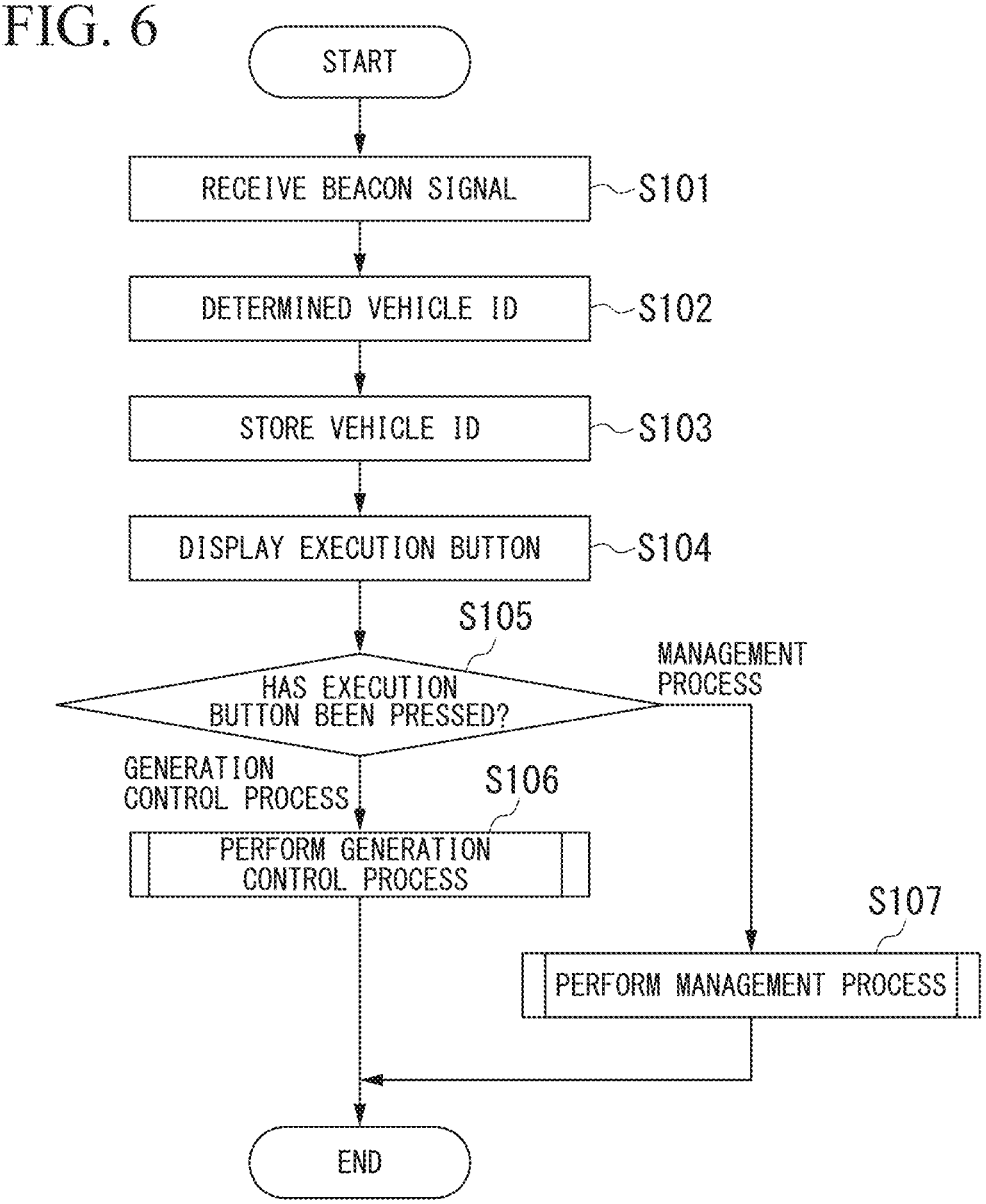
FIG. 6 is a flowchart illustrating the operation of the terminal device according to the first embodiment.

FIG. 6 is a flowchart illustrating the operation of the terminal device according to the first embodiment.

A driver D causes the terminal device 200 to execute an image-capturing control program used for performing an image-capturing method according to the first embodiment by operating the terminal device 200. When the terminal device 200 starts execution of the image-capturing control program, the beacon-receiving unit 201 starts a process of receiving a beacon signal (Step S101). In a case in which the terminal device 200 is present within a reaching distance of the beacon signal of the construction machine 100, the beacon-receiving unit 201 can receive a beacon signal transmitted by the construction machine 100. In other words, the beacon-receiving unit 201 receives a beacon signal from a neighboring construction machine 100. The beacon-receiving unit 201 determines a vehicle ID included in a beacon signal of which the reception intensity is the strongest among received beacon signals (Step S102). The beacon-receiving unit 201 stores the determined vehicle ID in the target vehicle-storing unit 205 (Step S103). Since a driver D brings a terminal device 200 into the driving compartment 121 of the construction machine 100, the intensity of a beacon signal transmitted by the construction machine 100 among beacon signals received by the terminal device 200 is the highest. Accordingly, the terminal device 200 can determine the construction machine 100 driven by the driver D as a target vehicle. By determining the target vehicle, a capture instruction and an acquisition instruction output in accordance with an operation of the terminal device 200 are transmitted to the construction machine 100 represented by the vehicle ID stored by the target vehicle-storing unit 205. In addition, a capture instruction and an acquisition instruction may be simultaneously transmitted to the target vehicle, or, in a case in which a capture instruction is transmitted to the target vehicle, an acquisition instruction may be automatically transmitted to the target vehicle.

Figure 7:
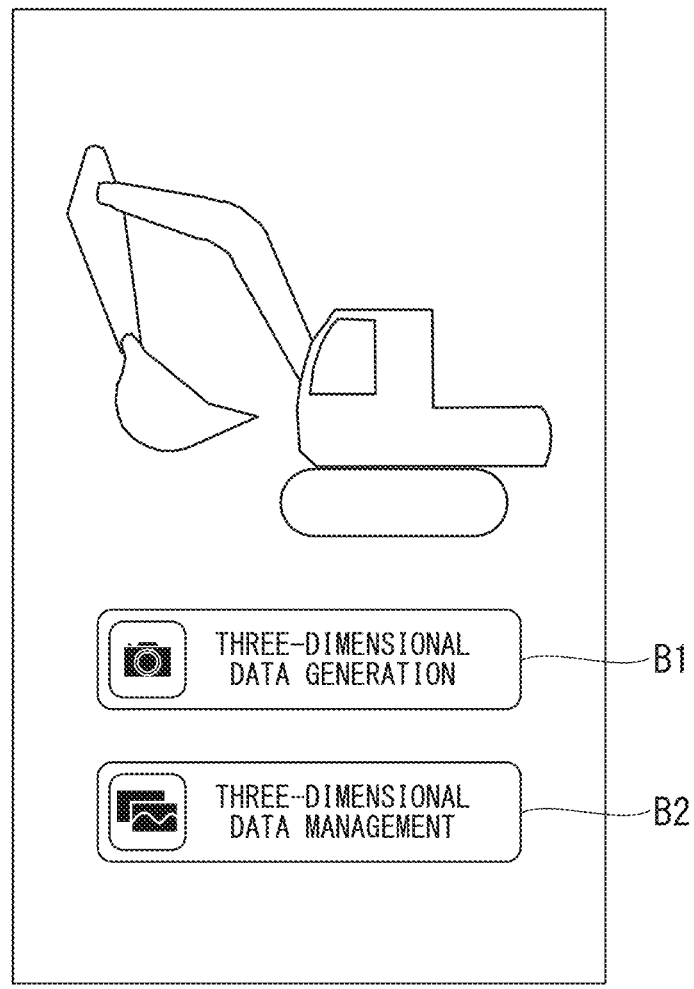
FIG. 7 is a diagram illustrating an example of a process selection screen displayed in the terminal device according to the first embodiment.

FIG. 7 is a diagram illustrating an example of a process selection screen displayed in the terminal device according to the first embodiment. In other words, FIG. 7 is a diagram illustrating one example of a screen displayed on a display that is the display unit RP.

When a vehicle ID is stored in the target vehicle-storing unit 205, the display control unit 203 displays a process selection screen including an execution button B1 for executing a three-dimensional data generation control process and an execution button 132 for executing a three-dimensional data management process on the display that is the display unit RP (Step S104). The input-receiving unit 204 accepts a pressing input of the execution button B1 for executing the generation control process or the execution button B2 for executing the management process that is displayed (Step S105). In a case in which the execution button B1 for executing the generation control process is pressed (Step S105: generation control process), the terminal device 200 executes the three-dimensional data generation control process (Step S106). On the other hand, in a case in which the execution button 132 for executing the management process is pressed (Step S105: management process), the terminal device 200 executes the three-dimensional data management process (Step S107).

Figure 8:
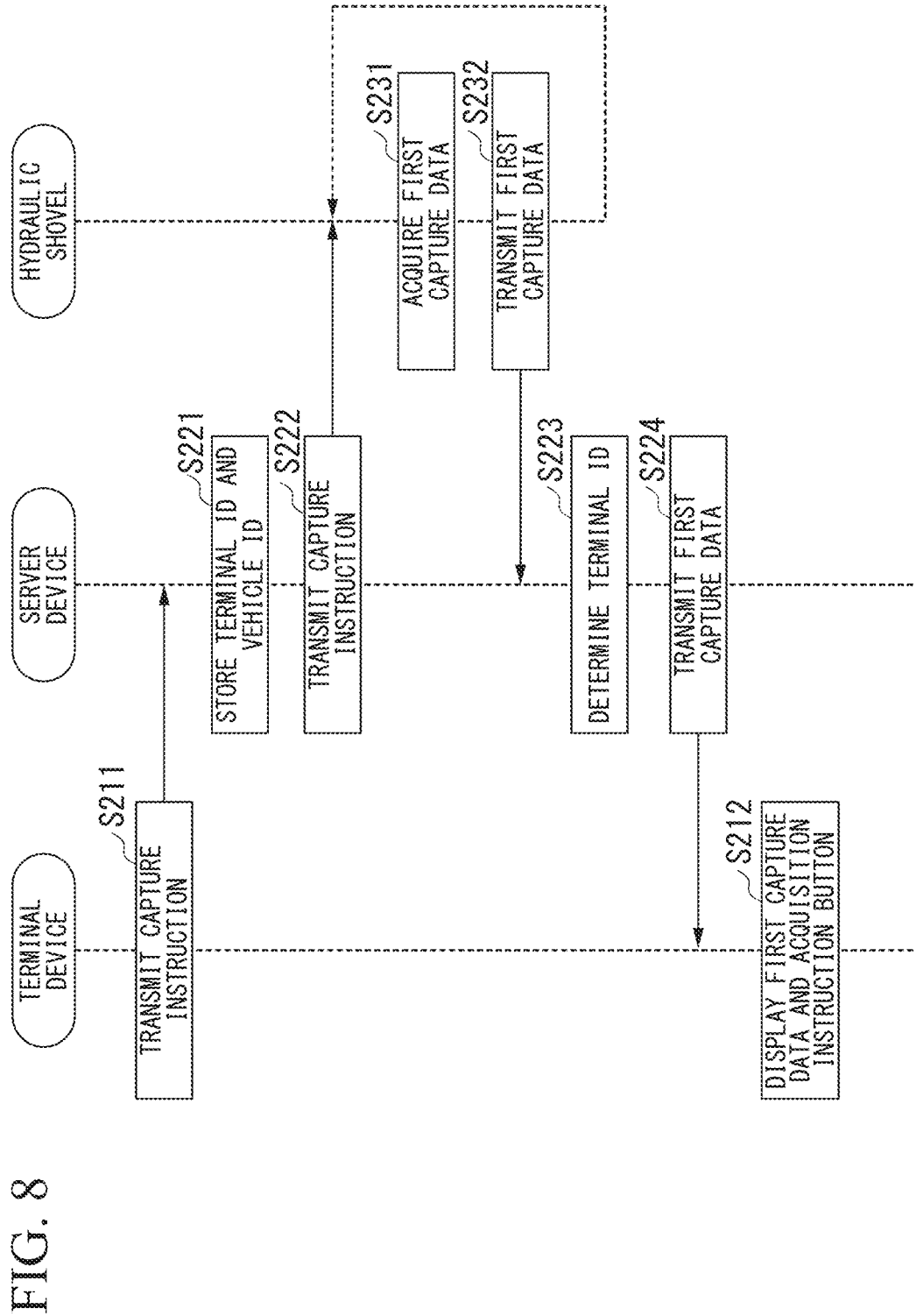
FIG. 8 is a first sequence diagram illustrating a three-dimensional data generation control process according to the first embodiment.

FIG. 8 is a first sequence diagram illustrating the three-dimensional data generation control process according to the first embodiment. The first sequence diagram illustrates a process from a step of transmitting a capture instruction using the terminal device 200 to a step of displaying capture data using the terminal device 200.

When the terminal device 200 starts a three-dimensional data generation control process in Step S106, the instruction-transmitting unit 206 transmits a capture instruction including a vehicle ID stored by the target vehicle-storing unit 205 to the server device 300 (Step S211). When a capture instruction is received from the terminal device 200, the instruction-transmitting unit 301 of the server device 300 stores a vehicle ID included in the capture instruction and a terminal ID representing the terminal device 200 that is the transmission source of the capture instruction in the connection relation-storing unit 302 in association with each other (Step S221). The relation between the vehicle ID and the terminal ID, which are stored in the connection relation-storing unit 302, is maintained until a connection between at least the terminal device 200 and the server device 300 is cut off. Next, the instruction-transmitting unit 301 transmits the received capture instruction to a construction machine 100 represented by the vehicle ID included in the capture instruction (Step S222).

When the instruction-receiving unit 1262 of the construction machine 100 receives a capture instruction from the server device 300, the capture data-acquiring unit 1263 acquires capture data (first capture data) from the first camera 1251 (Step S231). The first camera 1251 is disposed nearest the work equipment 110 among the cameras configuring the stereo cameras 125 and is disposed such that the optical axis is approximately parallel to the floor face of the driving compartment 121. For this reason, capture data captured by the first camera 1251 is data in which the front topography of the work equipment 110 is imaged. The data-transmitting unit 308 transmits the first capture data acquired by the capture data-acquiring unit 1263 to the server device 300 (Step S232). Hereinafter, until the connection between the terminal device 200 and the server device 300 is cut off, the construction machine 100 executes acquisition and transmission of the first capture data at predetermined time intervals (for example, every five seconds). By receiving a cutoff notification from the server device 300, the construction machine 100 can detect cutoff of the connection between the terminal device 200 and the server device 300.

When the first capture data is received from the construction machine 100, the data-transmitting unit 303 of the server device 300 determines a terminal ID associated with the vehicle ID of the construction machine 100 that is a transmission source of the first capture data in the connection relation-storing unit 302 (Step S223). The data-transmitting unit 303 transmits the first capture data to a terminal device 200 represented by the determined terminal ID (Step S224). When the data-receiving unit 202 of the terminal device 200 receives first capture data, the display control unit 203 displays a capture range-checking screen including a transmission button for transmitting an acquisition instruction of second capture data used for the generation of three-dimensional data and the received first capture data on the display that is the display unit RP (Step S212). At this time, the data-transmitting unit 303 of the server device 300 transmits first capture data received from the construction machine 100 at predetermined time intervals (for example, every five seconds) to the terminal device 200 at predetermined time intervals. The data-receiving unit 202 of the terminal device 200 receives first capture data from the data-transmitting unit 303 of the server device 300 at predetermined time intervals, and the display control unit 203 displays the received first capture data switched at predetermined time intervals on the display. In addition, the data-transmitting unit 303 may transmit only first capture data transmitted first from the construction machine 100 to the terminal device 200, and the display control unit 203 may display the first capture data on the display. The pressing of the transmission button for transmitting an acquisition instruction is one example of a transmission trigger of an acquisition instruction. In other words, after first capture data is received, the input-receiving unit 204 starts to receive an input of a transmission trigger of an acquisition instruction.

Figure 9:
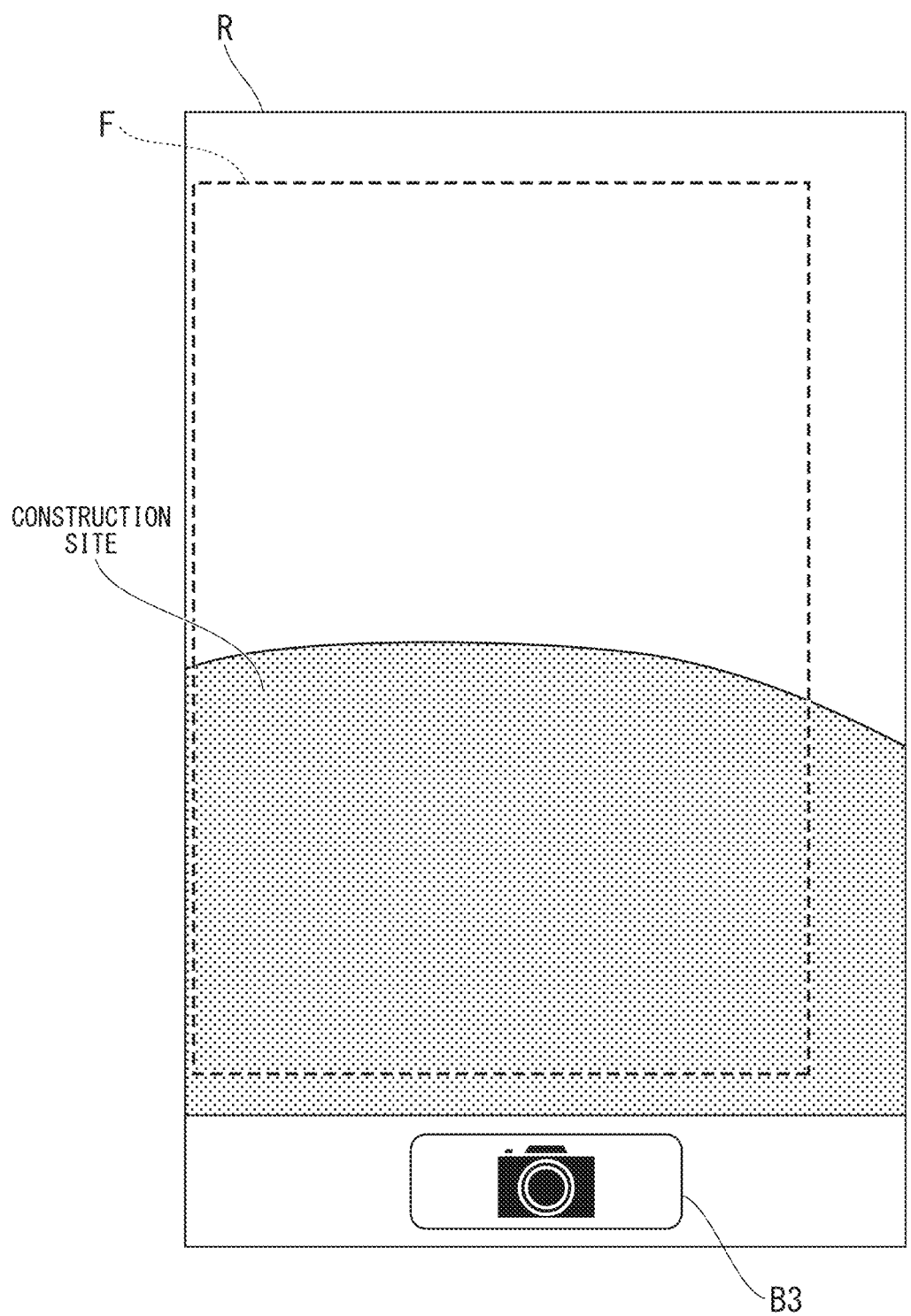
FIG. 9 is a diagram illustrating an example of a capture range-checking screen displayed in the terminal device according to the first embodiment.

FIG. 9 is a diagram illustrating an example of the capture range-checking screen displayed in the terminal device according to the first embodiment. In other words, FIG. 9 is a diagram illustrating one example of a screen displayed on the display that is the display unit RP.

As illustrated in FIG. 9, the capture range-checking screen includes a display area R of first capture data and a transmission button 133 for transmitting an acquisition instruction. In the display area R of the first capture data, a frame F representing a range used for generation of three-dimensional data is displayed. The range used for generation of three-dimensional data is an overlapping portion of capture ranges of cameras forming a pair and is a range used for measuring a topography. In other words, in the display control unit 203, a frame F representing a portion of the capture range of the first camera 1251 that overlaps the capture range of the third camera 1253 is displayed on the display as measuring range information. The size of the frame F is based on a known capture range and, for example, is stored in the display control unit 203 as graphic data. In the example illustrated in FIG. 9, although the frame F is represented using broken lines, in another embodiment, the frame F may be emphasized, for example, using red solid lines or the like instead of the broken lines as the measuring range information. In addition, the display control unit 203 may represent a character indicating a capture range together with the frame F as measuring range information. Accordingly, after checking that a desired topography is imaged within a range used for generation of three-dimensional data (a capture range or a capture content), a driver D who is a photographer can press a transmission button for transmitting an acquisition instruction for acquiring capture data used for the generation of three-dimensional data.

Figure 10:
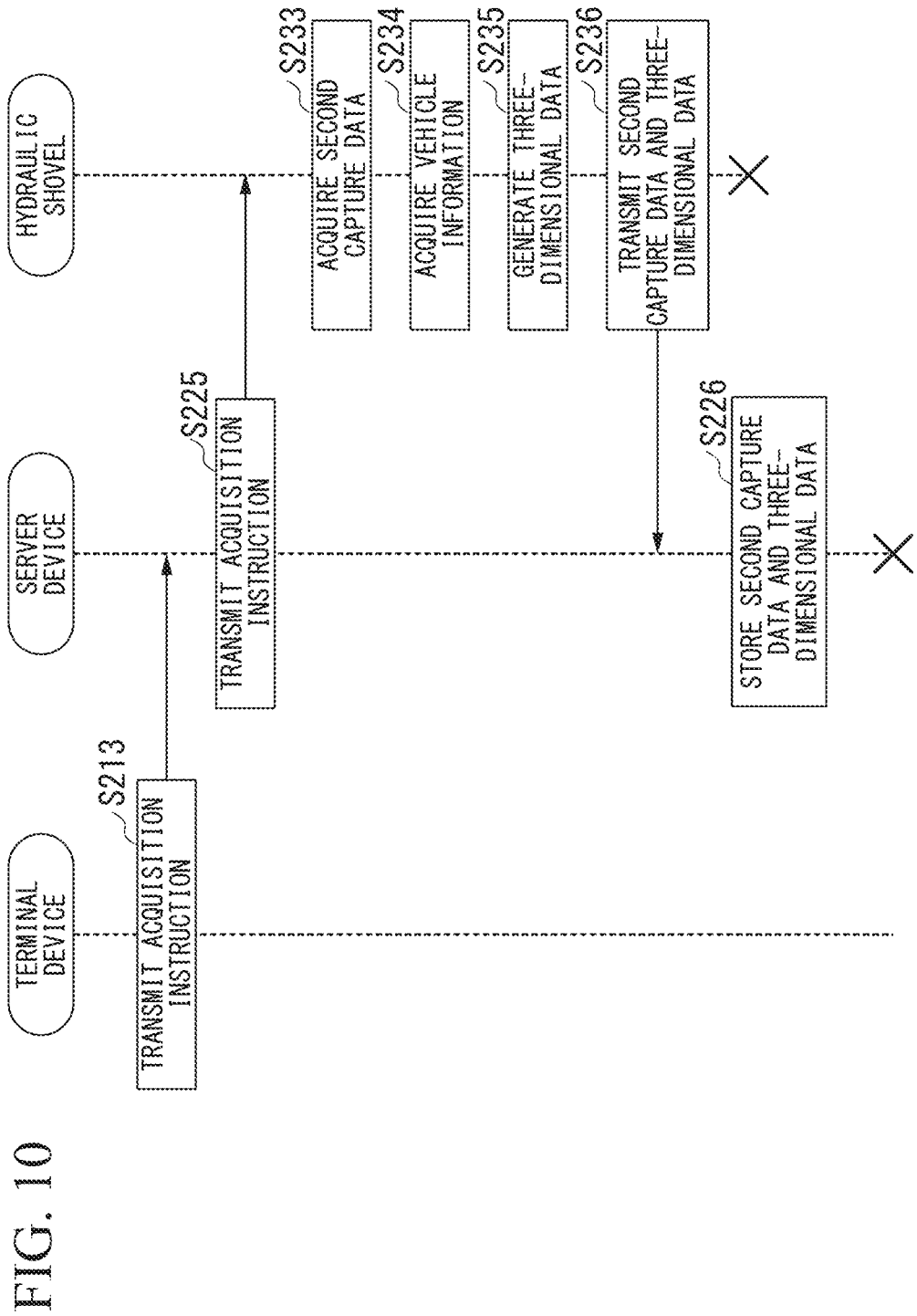
FIG. 10 is a second sequence diagram illustrating a three-dimensional data generation control process according to the first embodiment.

FIG. 10 is a second sequence diagram illustrating a three-dimensional data generation control process according to the first embodiment. The second sequence diagram illustrates a process from a step of transmitting an acquisition instruction for acquiring capture data using the terminal device 200 to a step of causing the server device 300 to execute various processes (transmission, integration, or reflection of three-dimensional data).

After the terminal device 200 displays a transmission button for transmitting an acquisition instruction, when a driver D presses the transmission button, the instruction-transmitting unit 206 transmits an acquisition instruction for acquiring capture data used for generation of three-dimensional data to the server device 300 (Step S213). In the acquisition instruction, a vehicle ID stored by the target vehicle-storing unit 205 is included. The instruction-transmitting unit 301 of the server device 300 transmits the received acquisition instruction to a construction machine 100 represented by a vehicle ID included in the acquisition instruction (Step S225).

When the instruction-receiving unit 1262 of the construction machine 100 receives an acquisition instruction, the capture data-acquiring unit 1263 acquires capture data (second capture data) from all the cameras (the first camera 1251, the second camera 1252, the third camera 1253, and the fourth camera 1254) of the stereo cameras 125 (Step S233). At this time, in the capture data, a time stamp representing a capture time is included. In addition, in another embodiment, a time stamp may be acquired as separate data associated with capture data instead of being included in the capture data.

The vehicle information-acquiring unit 1264 acquires vehicle information such as position information, azimuth information, and posture information respectively from the position detector 122, the azimuth detector 123, and the posture detector 124 (Step S234). The three-dimensional data-generating unit 1265 generates three-dimensional data of the capture range according to the stereo camera 125 on the basis of the second capture data, the position information, the azimuth information, and the posture information that have been acquired (Step S235). Similar to the capture data, a time stamp is included in the generated three-dimensional data. A value of the time stamp may be a capture time of capture data used for generation of three-dimensional data or a generation time of three-dimensional data.

The data-transmitting unit 1266 transmits the generated three-dimensional data, the second capture data, the position information, the site ID, and the vehicle ID of the construction machine 100 to the server device 300 (Step S236). In a case in which the time stamp is acquired as separate data from capture data and three-dimensional data, the data-transmitting unit 1266 also transmits the time stamp to the server device 300. Position information transmitted here may be position information determined from a GNSS or position information represented by an address of a construction site. When three-dimensional data and second capture data are received, the data-receiving unit 304 of the server device 300 stores the three-dimensional data, the second capture data, a vehicle ID, position information, and a site ID in the data-storing unit 305 (Step S226). In a case in which a time stamp is acquired as separate data from the capture data and the three-dimensional data, the data-receiving unit 304 also records the time stamp in the data-storing unit 305.

Accordingly, after allowing a driver D to check a capture range and a capture content used for generation of three-dimensional data, the terminal device 200 can transmit an acquisition instruction for acquiring capture data used for the generation of three-dimensional data to the construction machine 100.

Figure 11:
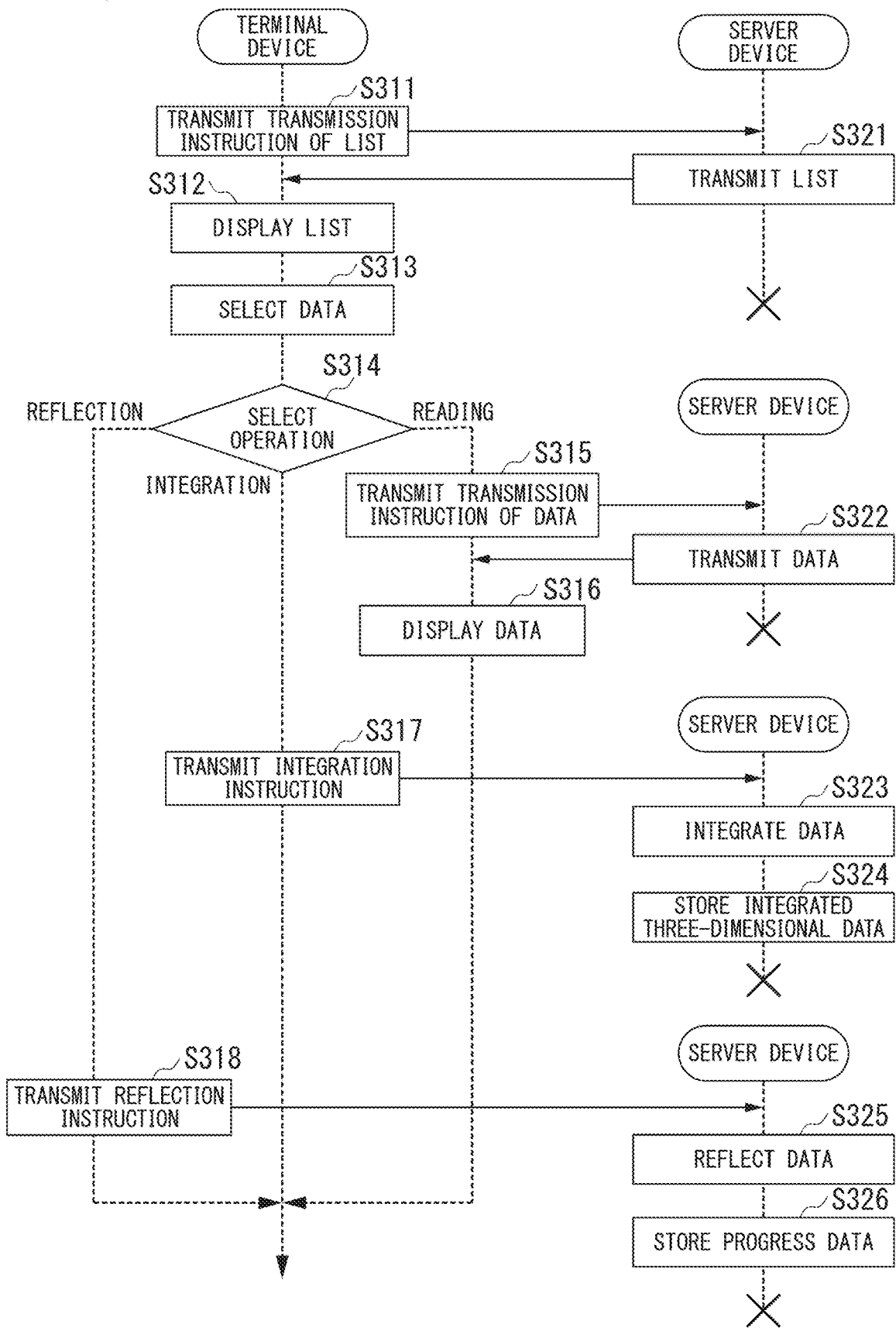
FIG. 11 is a sequence diagram illustrating a three-dimensional data management process according to the first embodiment.

FIG. 11 is a sequence diagram illustrating a three-dimensional data management process (FIG. 6, Step S107) according to the first embodiment.

When the terminal device 200 instructs of a management process of three-dimensional data in Step S107, the instruction-transmitting unit 206 transmits a transmission instruction for transmitting a list of three-dimensional data and capture data to the server device 300 (Step S311). In the transmission instruction, a vehicle ID stored by the target vehicle-storing unit 205 is included. When the instruction-receiving unit 307 of the server device 300 receives a transmission instruction, the data-transmitting unit 308 generates a list of three-dimensional data and capture data stored by the data-storing unit 305 and transmits the generated list to the terminal device 200 (Step S321). At this time, the data-transmitting unit 308 extracts data associated with the vehicle ID included in the transmission instruction from the data-storing unit 305 from among data stored by the data-storing unit 305, thereby generating a list. The list has a combination of three-dimensional data and capture data used for generation of the three-dimensional data as one constituent unit. When the data-receiving unit 202 of the terminal device 200 receives a list, the display control unit 203 displays the received list on the display that is the display unit RP (Step S312).

The input-receiving unit 204 accepts selection of a combination of three-dimensional data and capture data included in the received list (Step S313). At this time, a plurality of combinations may be selected. When selection of a combination of three-dimensional data and capture data is accepted, the input-receiving unit 204 accepts the selection of an operation for the selected combination (Step S314). As options of the operation, there are data reading, data integrating, and reflection on construction progress information.

In a case in which data reading is selected (Step S314: reading), the instruction-transmitting unit 206 transmits a transmission instruction for transmitting selected data to the server device 300 (Step S315). In the transmission instruction, identification information of data that is a transmission target is included. When the instruction-receiving unit 307 of the server device 300 receives a transmission instruction, the data-transmitting unit 308 reads three-dimensional data and capture data represented by the transmission instruction from the data-storing unit 305 and transmits the read data to the terminal device 200 (Step S322). When the data-receiving unit 202 of the terminal device 200 receives the three-dimensional data and the capture data, the display control unit 203 displays the three-dimensional data and the capture data that have been received on the display (Step S316). In addition, in the three-dimensional data received by the data-receiving unit 304, integrated three-dimensional data is included. Accordingly, a driver D can check whether or not three-dimensional data representing an appropriate range has been generated by the control device 126 of the construction machine 100. In addition, together with the three-dimensional data and the capture data, a time stamp associated with such data may be displayed by the display control unit 203.

In a case in which data integrating is selected in Step S314 (Step S314: integrating), the instruction-transmitting unit 206 transmits an integration instruction for integrating selected data (a combination of three-dimensional data and capture data) to the server device 300 (Step S317). In addition, in a case in which data integrating is selected, it is necessary to select a plurality of pieces of data. In the integration instruction, identification information of a plurality of pieces of data that are integration targets is included.

Figure 12:
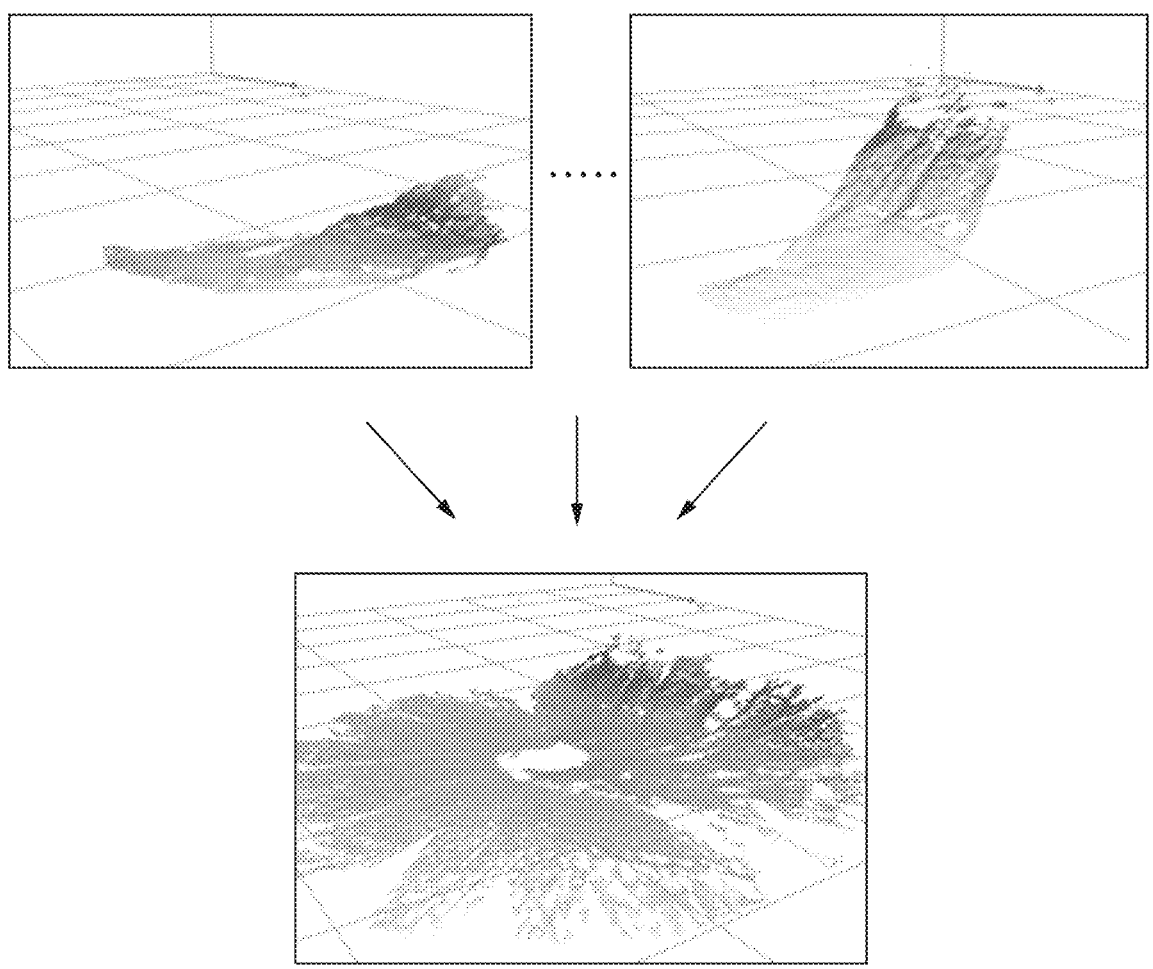
FIG. 12 is a diagram illustrating a process of generating integrated three-dimensional data from three-dimensional data.

When the instruction-receiving unit 307 of the server device 300 receives an integration instruction, the three-dimensional data-integrating unit 306 reads a plurality of pieces of three-dimensional data represented by identification information included in the integration instruction. The three-dimensional data-integrating unit 306 integrates the plurality of pieces of read three-dimensional data into one integrated three-dimensional data (Step S323). FIG. 12 is a diagram illustrating a process of generating integrated three-dimensional data from three-dimensional data. The three-dimensional data that is an integrating target, as illustrated on the upper side in FIG. 12, is three-dimensional data represented in an absolute coordinate system having a common reference position as its origin. The three-dimensional data-integrating unit 306 integrates three-dimensional data having the common origin, thereby generating integrated three-dimensional data as illustrated in a lower side in FIG. 12. Details of the integrating process will be described later. The three-dimensional data-integrating unit 306 stores the integrated three-dimensional data that has been generated in the data-storing unit 305 (Step S324). Accordingly, the integrated three-dimensional data is newly added to the list of three-dimensional data generated in Step S321. Accordingly, thereafter, the driver D can check the integrated three-dimensional data by causing the terminal device 200 to execute processes of Steps S312 to S316. In other words, the driver D selects integrated three-dimensional data from the list displayed in Step S312 by the terminal device 200 and selects the data reading in Step S314, whereby the integrated three-dimensional data is transmitted from the server device 300 to the terminal device 200, and the integrated three-dimensional data is displayed on the terminal device 200. Accordingly, the driver D can check the integrated three-dimensional data.

In a case in which reflection on the construction progress information is selected in Step S314 (Step S314: reflection), the instruction-transmitting unit 206 transmits a reflection instruction for reflecting selected data to the server device 300 (Step S318). In the reflection instruction, identification information of data that is a reflection target is included. The data that is a reflection target may be integrated three-dimensional data. When the instruction-receiving unit 307 of the server device 300 receives a reflection instruction, the three-dimensional data-integrating unit 306 reads three-dimensional data (reflection target data) represented by identification information included in the reflection instruction and three-dimensional data representing a completed form. The three-dimensional data representing the completed form is information, which is generated by a construction company or the like in advance, representing a topography after the completion of construction of the construction site. As the three-dimensional data representing the completed form, for example, data displayed in a polygon such as a triangle or the like may be used. The three-dimensional data-integrating unit 306 acquires a part of three-dimensional data representing the completed form of which a plane position overlaps the reflection target data as data (progress data) representing a topography in the middle of construction or data (work amount data) of a cutting amount or a filling amount in the middle of construction (Step S325). More specifically, the three-dimensional data-integrating unit 306, for a position at which plane positions of progress data before reflection stored in advance and three-dimensional data that is a reflection target overlap each other (a position of which x and y coordinates are the same), substitutes height data (z coordinate) of the progress data with height data of the three-dimensional data that is a reflection target, thereby updating the progress data. In addition, the three-dimensional data-integrating unit 306, for a position at which plane positions of the progress data before reflection and the three-dimensional data that is a reflection target overlap each other, acquires work amount data on the basis of a difference in height data between the progress data before reflection and the three-dimensional data that is the reflection target. In addition, in a case in which a plurality of pieces of data (three-dimensional data, integrated three-dimensional data, or a combination thereof) are selected as data that is a reflection target, the three-dimensional data-integrating unit 306, for a position at which plane positions overlap each other between the data, generates progress data using height information of latest data (a data of which a time stamp is newest). The three-dimensional data-integrating unit 306 stores the updated progress data in the data-storing unit 305 (Step S326). Accordingly, progress data is newly added to the list of three-dimensional data generated in Step S321. Accordingly, thereafter, by causing the terminal device 200 to execute processes of Steps S312 to S316, the driver D can check the updated progress data. In other words, the driver D selects progress data from the list displayed in Step S312 by the terminal device 200 and selects the data reading in Step S314, whereby the progress data is transmitted from the server device 300 to the terminal device 200, and the progress data is displayed in the terminal device 200. Accordingly, the driver D can check the progress data.

<<Integrating Process>>

Figure 13:
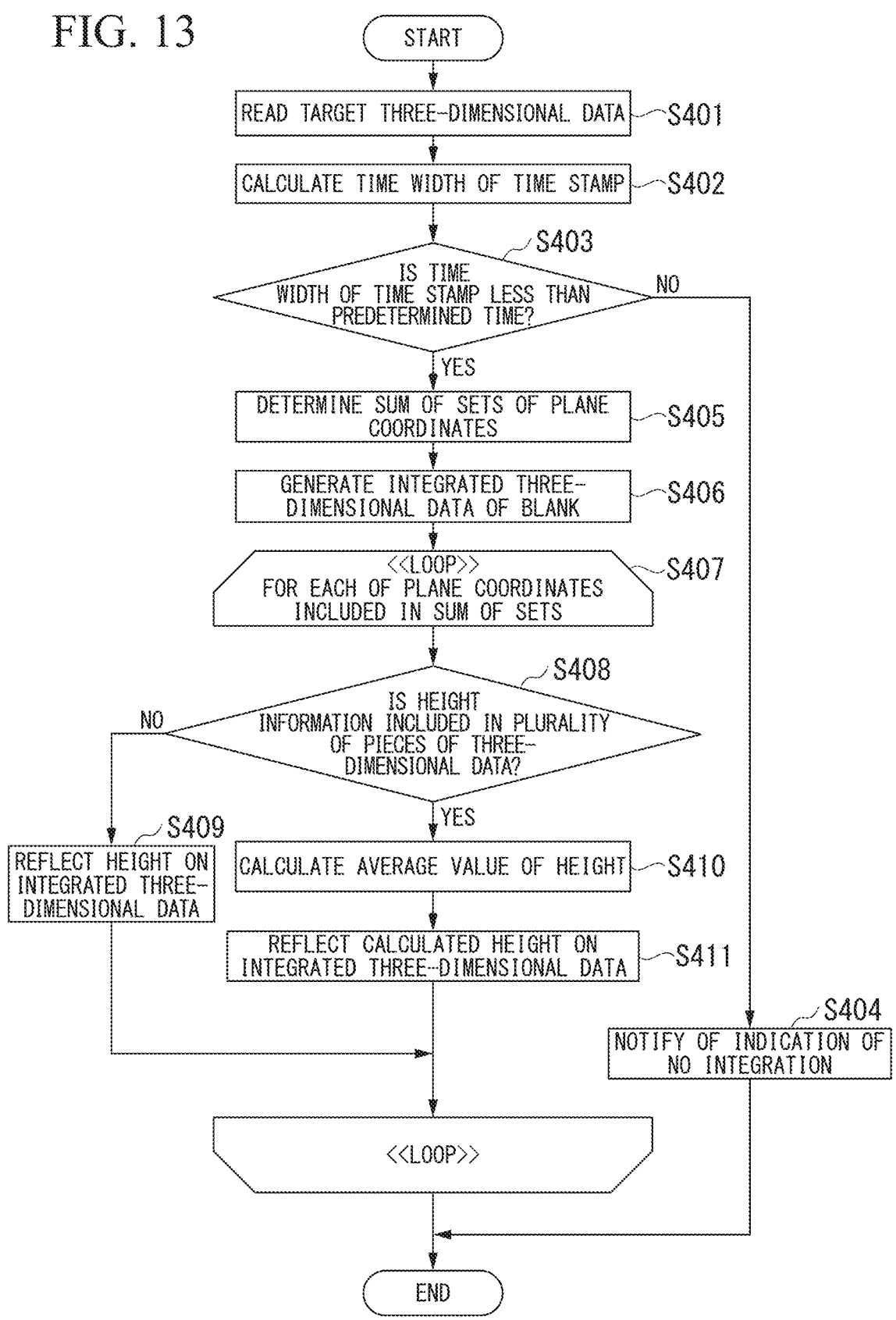
FIG. 13 is a flowchart illustrating an integrating process according to the first embodiment.

Here, the integrating process illustrated in Step S323 will be described in detail. FIG. 13 is a flowchart illustrating the integrating process according to the first embodiment.

The three-dimensional data-integrating unit 306 reads three-dimensional data represented by identification information included in the integration instruction received by the instruction-receiving unit 307 (Step S401). Next, the three-dimensional data-integrating unit 306 calculates a time represented by a time stamp associated with the read three-dimensional data and a time width of the time stamp (a difference in time between an oldest time and a newest time) (Step S402). Next, the three-dimensional data-integrating unit 306 evaluates whether or not the calculated time width is less than a predetermined time (Step S403). In a case in which the time width is the predetermined time or more (Step S403: No), the three-dimensional data-integrating unit 306 notifies the terminal device 200 of being incapable of integrating the three-dimensional data (Step S404) and ends the integrating process. The reason for this is that, in a case in which generation times of three-dimensional data that is an integration target are separate by a predetermined time or more, until new three-dimensional data is generated after generation of old three-dimensional data, there is a possibility that certain constructions such as excavating or filling in may have been performed, and the topography may have changed.

In a case in which the time width is less than the predetermined time (Step S403: Yes), the three-dimensional data-integrating unit 306 determines a sum of sets of plane coordinates at which height data is present from each piece of three-dimensional data that has been read (Step S405). Here, a case will be described as an example in which first three-dimensional data is a point group formed from coordinates (X1, Y1, Z1), coordinates (X2, Y2, Z2), and coordinates (X3, Y3, Z3), and second three-dimensional data is a point group formed from coordinates (X3, Y3, Z1), coordinates (X4, Y4, Z4), and coordinates (X5, Y5, and Z5). Coordinates (X, Y, Z) are coordinates determined by latitude X, longitude Y, and altitude Z. In other words, plane coordinates are coordinates represented by a combination of latitude X and longitude Y. In this case, a sum of sets of plane coordinates at which height data is present in the first three-dimensional data and the second three-dimensional data is coordinates (X1, Y1), coordinates (X2, Y2), coordinates (X3, Y3), coordinates (X4, Y4), and coordinates (X5, Y5). Next, the three-dimensional data-integrating unit 306 generates blank integrated three-dimensional data (Step S406).

Next, the three-dimensional data-integrating unit 306 selects plane coordinates included in the sum of sets determined in Step S405 one at each time and executes processes of Steps S408 to S411 represented below (Step S407). First, the three-dimensional data-integrating unit 306 evaluates whether or not a plurality of pieces of data having height information for the selected plane coordinates are present in the three-dimensional data read in Step S401 (Step S408). In other words, the three-dimensional data-integrating unit 306 evaluates whether or not height information relating to the same plane coordinates is included in the other three-dimensional data. In a case in which the height information relating to the selected plane coordinates is included in only one piece of the three-dimensional data (Step S408: No), the height information is reflected on the selected plane coordinates in the integrated three-dimensional data (Step S409). Accordingly, the three-dimensional data is recorded in the integrated three-dimensional data.

On the other hand, in a case in which the height information related to the selected plane coordinates is included in a plurality of pieces of three-dimensional data (Step S408: Yes), the three-dimensional data-integrating unit 306 calculates an average value of heights from each height information (Step S410). Then, the three-dimensional data-integrating unit 306 reflects the average value of heights on the selected plane coordinates in the integrated three-dimensional data as height information (Step S411). Accordingly, the three-dimensional data is recorded in the integrated three-dimensional data.

By executing the processes of Steps S408 to S411 described above for all the plane coordinates included in the sum of sets determined in Step S407, the three-dimensional data-integrating unit 306 can generate integrated three-dimensional data.

<<Operation and Effects>>

In this way, according to the first embodiment, the terminal device 200 receives capture data captured by the stereo cameras 125, displays the received capture data on the display unit RR and transmits an acquisition instruction for acquiring the capture data used for generation of three-dimensional data to the construction machine 100. Accordingly, when the acquisition instruction is transmitted, the terminal device 200 can allow a driver D who is a photographer to check a capture range and a capture content according to the stereo cameras 125. Accordingly, the driver D can cause the control device 126 to generate three-dimensional data relating to a desired place.

In addition, according to the first embodiment, the terminal device 200 receives an input of a transmission trigger of an acquisition instruction after the capture data is displayed in the display unit RP. Accordingly, by inputting the transmission trigger when it can be checked that the stereo cameras 125 will capture a desired capture range and a desired capture content, the driver D can cause the control device 126 to generate three-dimensional data relating to a desired place.

In addition, according to the first embodiment, the terminal device 200 transmits a capture instruction including a vehicle ID and receives capture data from the construction machine 100 represented by the vehicle ID. Accordingly, even in a case in which a plurality of construction machines 100 are present in a construction site, the terminal device 200 can receive capture data from a desired construction machine 100.

Furthermore, according to the first embodiment, the terminal device 200 receives three-dimensional data from the server device 300 and displays the three-dimensional data. Accordingly, a driver D can check whether or not three-dimensional data relating to the desired place is appropriately generated by the construction machine 100.

In addition, according to the first embodiment, the terminal device 200 displays the measuring range information representing a range used for generation of three-dimensional data on the display unit RP together with the capture data. Accordingly, a driver D can check whether or not a desired place imaged in the capture data is included in the range used for the generation of three-dimensional data.

In addition, according to the first embodiment, the server device 300 can generate integrated three-dimensional data acquired by integrating a plurality of pieces of three-dimensional data. Accordingly, by reading the integrated three-dimensional data using the terminal device 200, a driver D can easily check the presence/absence of a missed construction area in imaging and an area which has failed to generate three-dimensional data. In other words, in a case in which integrated three-dimensional data is not present, the driver D needs to check pieces of capture data or three-dimensional data one by one and check whether or not there is a missed construction area in imaging and an area which has failed to generate three-dimensional data. In addition, even when pieces of capture data or three-dimensional data are checked one by one, there is a possibility that the driver D may erroneously evaluate the presence/absence of a missed construction area in imaging. Furthermore, by reading the integrated three-dimensional data, the driver D can easily recognize the whole topography after work and his or her position.

In other words, the purpose of the integrated three-dimensional data is for allowing easy checking of whether or not there is a missed construction area in imaging or an area which has failed to generate three-dimensional data or easy recognizing of the whole topography after work.

According to the first embodiment, the server device 300 performs integration of three-dimensional data in a case in which a time width of times associated with a plurality of pieces of three-dimensional data that are integration targets is a predetermined time or less.

Accordingly, the server device 300 can generate the integrated three-dimensional data in a state in which there is a low probability that the topography changes in accordance with certain construction such as excavating or filling until new three-dimensional data is generated after the generation of old three-dimensional data.

Modified Example

In the first embodiment, although a vehicle ID included in a beacon signal of which the reception intensity is the strongest is determined when the terminal device 200 determines a target vehicle in Step S102, the determination of a vehicle ID is not limited thereto in another embodiment. For example, in another embodiment, the beacon-receiving unit 201 may determine a vehicle ID included in a beacon signal of which the reception intensity is the strongest among beacon signals of which the reception intensities are continuously a predetermined intensity or more during a predetermined time. In addition, for example, in another embodiment, the beacon-receiving unit 201 may display a list of vehicle IDs included in beacon signals of which the reception intensities are a predetermined intensity or more in the terminal device 200 or the like, and a selected vehicle ID among them may be determined.

In the first embodiment, in the integrating process, in a case in which a plurality of pieces of height information are present for the same plane coordinates, although the server device 300 acquires an average value thereof and reflects the average value on the integrated three-dimensional data, the method of reflection thereof is not limited thereto in another embodiment. For example, in another embodiment, the server device 300 may reflect height information relating to three-dimensional data of which a time stamp represents the newest time (the generation time of three-dimensional data is the latest) among a plurality of pieces of three-dimensional data on integrated three-dimensional data. In such a case, the three-dimensional data-integrating unit 306 of the server device 300, instead of the processes of Steps S407 to S411, may update the integrated three-dimensional data by reading three-dimensional data in order of oldest to newest generation time and sequentially rewriting the height information. In addition, in another embodiment, the construction machine 100 may include a three-dimensional data-integrating unit 306, and the integrating process may be performed by the construction machine 100.

Figure 18:
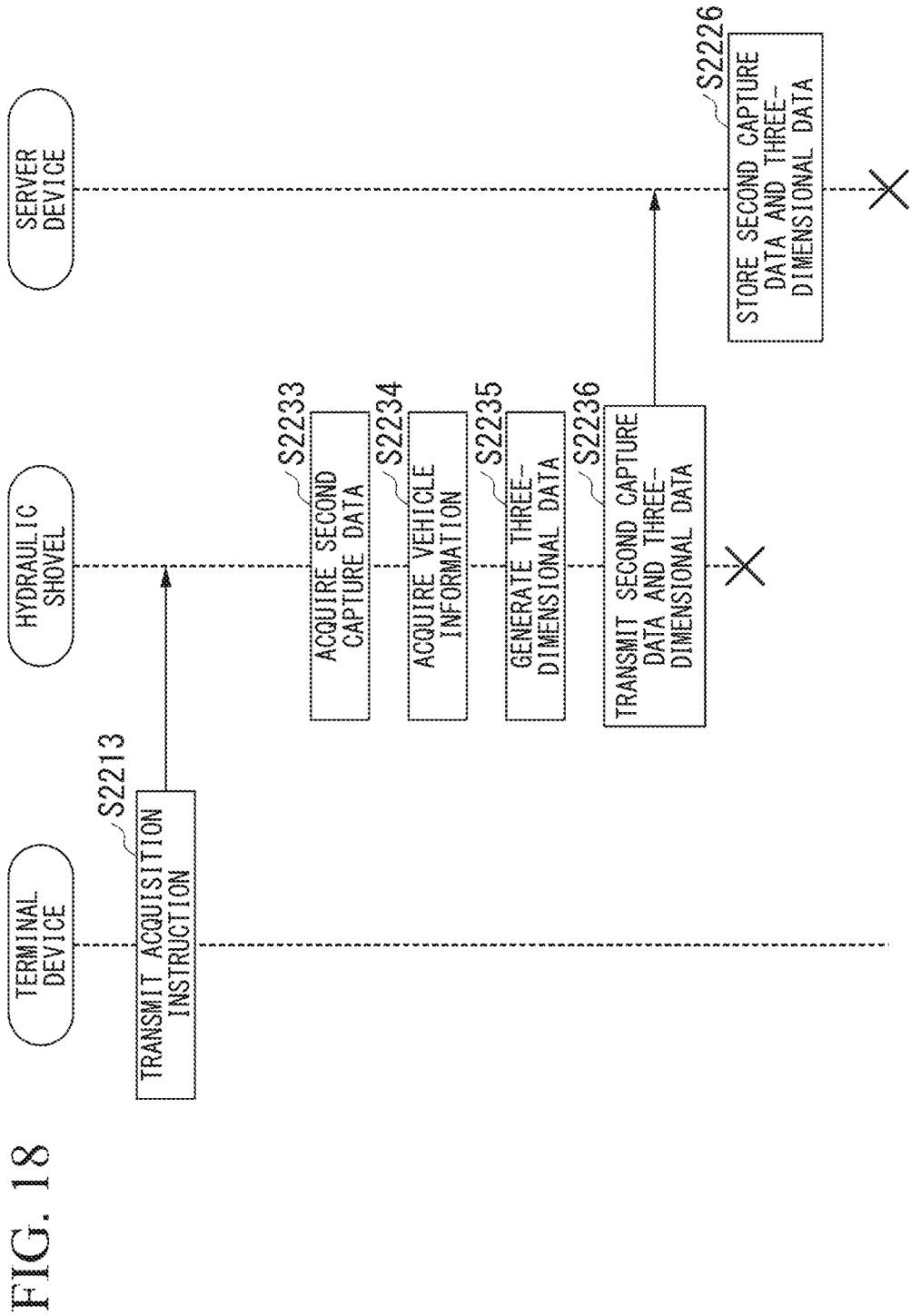
FIG. 18 is a second sequence diagram illustrating a three-dimensional data generation control process according to the third embodiment.

In such a case, the three-dimensional data-generating unit 1265 of the construction machine 100 generates a plurality of pieces of three-dimensional data in Step S2235 illustrated in FIG. 18, and, after the three-dimensional data-integrating unit 306 of the construction machine 100 integrates these using the method illustrated in FIG. 13, the data-transmitting unit 1266 transmits the second capture data, the three-dimensional data, and the integrated three-dimensional data in Step S2236. In such a case, the control device 126 of the construction machine 100 is one example of a data-integrating device.

In the first embodiment, in the integrating process, although the server device 300 evaluates whether or not a time width of times associated with a plurality of pieces of three-dimensional data that are integration targets is a predetermined time or less, another embodiment is not limited thereto. For example, in another embodiment, the server device 300 may generate integrated three-dimensional data regardless of times associated with a plurality of pieces of three-dimensional data that are integration targets. In addition, for example, in another embodiment, the terminal device 200 may evaluate whether or not a time width of times associated with three-dimensional data that are integration targets is a predetermined time or less.

In such a case, the terminal device 200 does not transmit an integration instruction in a case in which a time width of times associated with three-dimensional data selected in Step S313 is a predetermined time or more. For example, in a case in which a time width of times associated with three-dimensional data selected in Step S313 is a predetermined time or more, the terminal device 200 may disable the selection of data in Step S314.

Second Embodiment

<<Construction Management System>>

Figure 14:
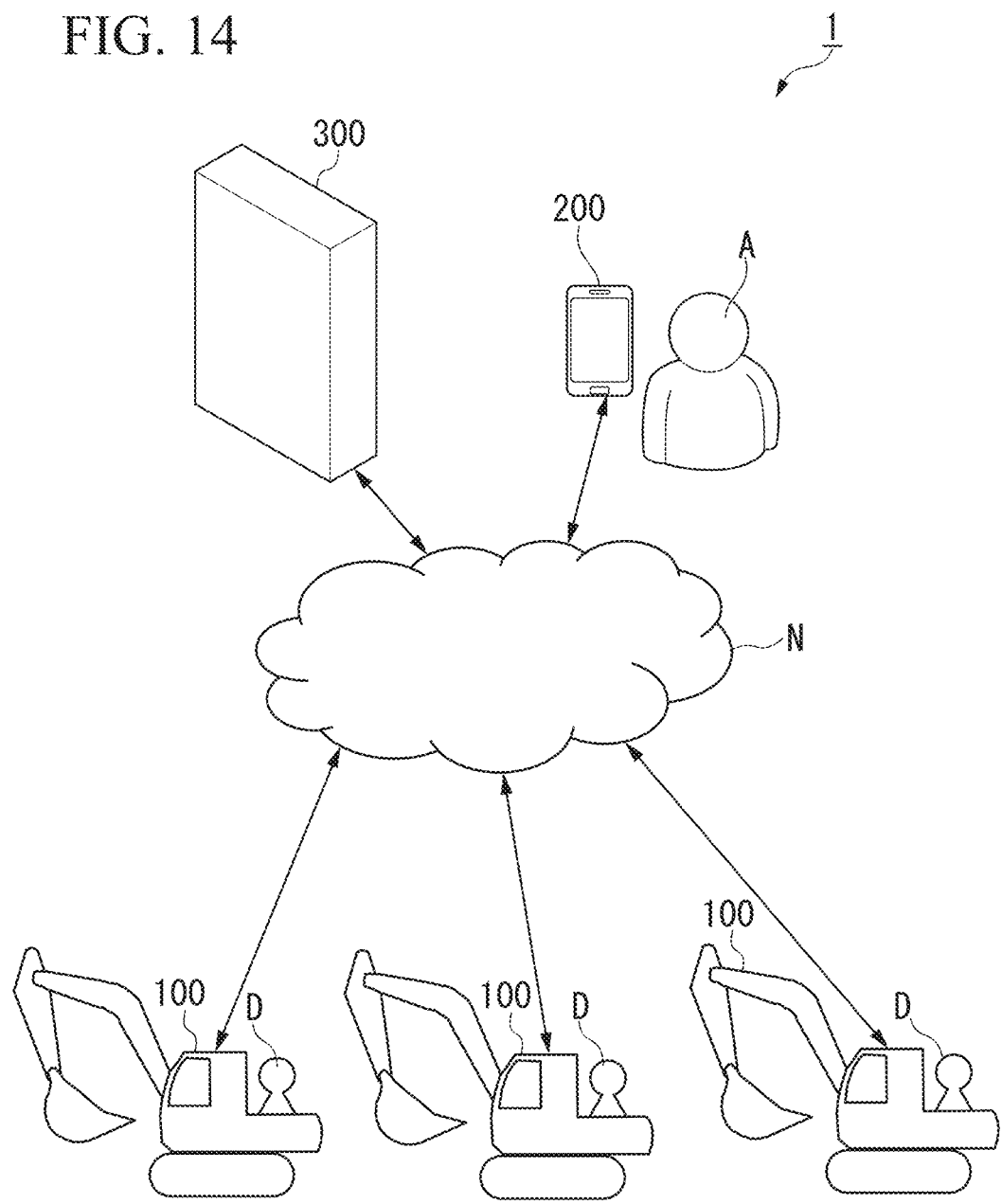
FIG. 14 is a schematic diagram illustrating the configuration of a construction management system according to a second embodiment.

FIG. 14 is a schematic diagram illustrating the configuration of a construction management system according to a second embodiment.

In the construction management system 1 according to the first embodiment, a driver D instructs the construction machine 100 to perform image capturing and generation of three-dimensional data by operating a terminal device 200. On the other hand, in the construction management system 1 according to the second embodiment, a manager A of a construction site is a photographer, and the manager A instructs the construction machine 100 to perform image capturing and generation of three-dimensional data by operating the terminal device 200. As the terminal device 200 according to the second embodiment, for example, a smartphone, a mobile phone, or a portable computer may be used. In addition, the terminal device 200, for example, may be a personal computer (PC) including a display unit that is disposed at an office located far from a construction site.

In a case in which the manager A operates the terminal device 200, since a target vehicle may not include the beacon-transmitting unit 1261, or since a beacon signal of the target vehicle may not arrive at the terminal device 200 even when the target vehicle includes the beacon-transmitting unit 1261, there is a possibility that it is difficult to perform evaluation of the target vehicle based on the beacon signal as in the first embodiment. For this reason, the terminal device 200 according to the second embodiment evaluates a target vehicle without using a beacon signal.

Figure 15:
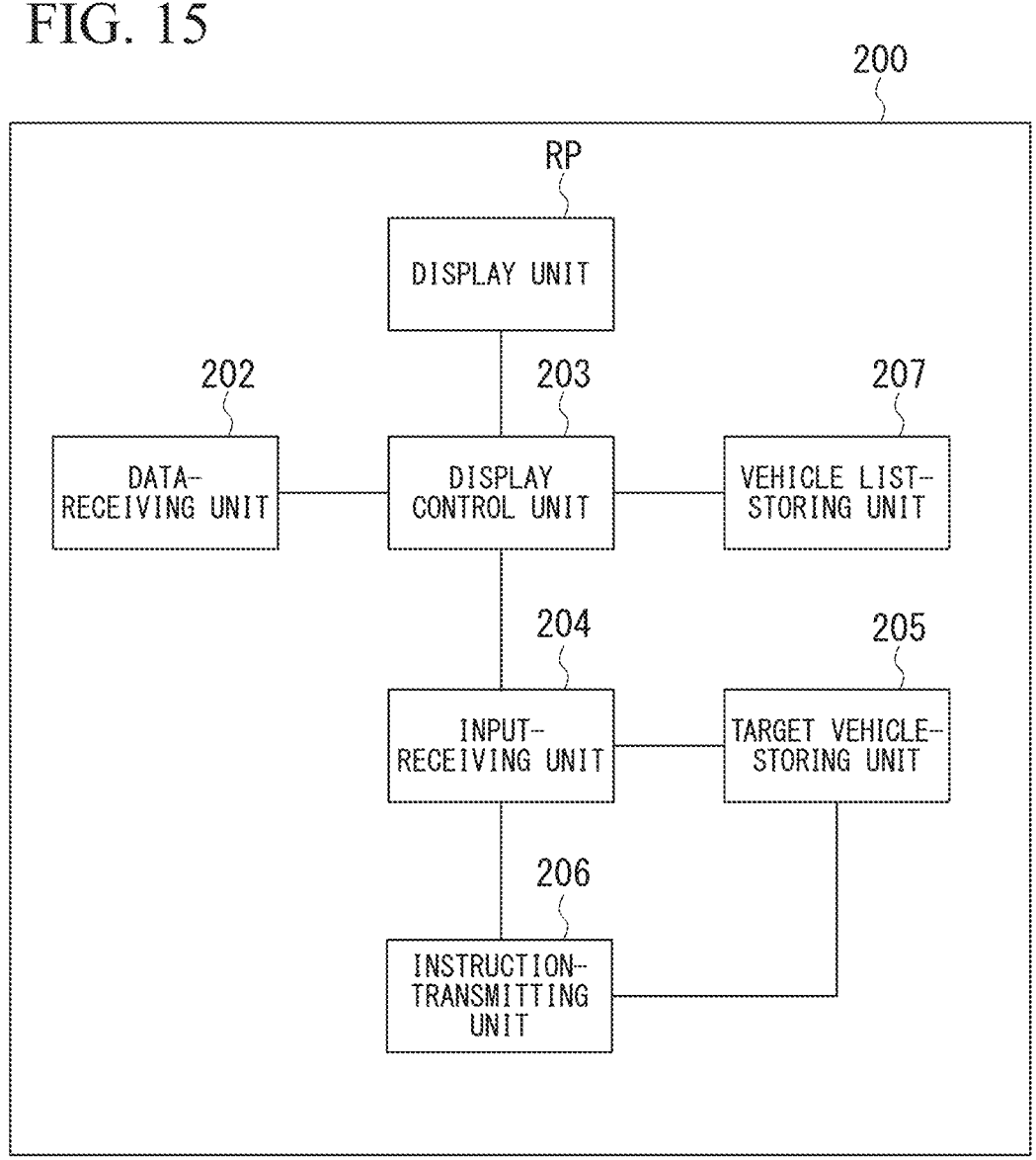
FIG. 15 is a schematic block diagram illustrating the configuration of a terminal device according to the second embodiment.

FIG. 15 is a schematic block diagram illustrating the configuration of the terminal device according to the second embodiment.

The terminal device 200 according to the second embodiment includes a vehicle list-storing unit 207 instead of the beacon-receiving unit 201 of the terminal device 200 according to the first embodiment. The vehicle list-storing unit 207 stores a list respectively associating a plurality of site IDs used for identifying construction sites with vehicle IDs of construction machines 100 operating at the construction sites.

The construction machine 100 according to the second embodiment may not include the beacon-transmitting unit 1261.

<<Operation>>

Figure 16:
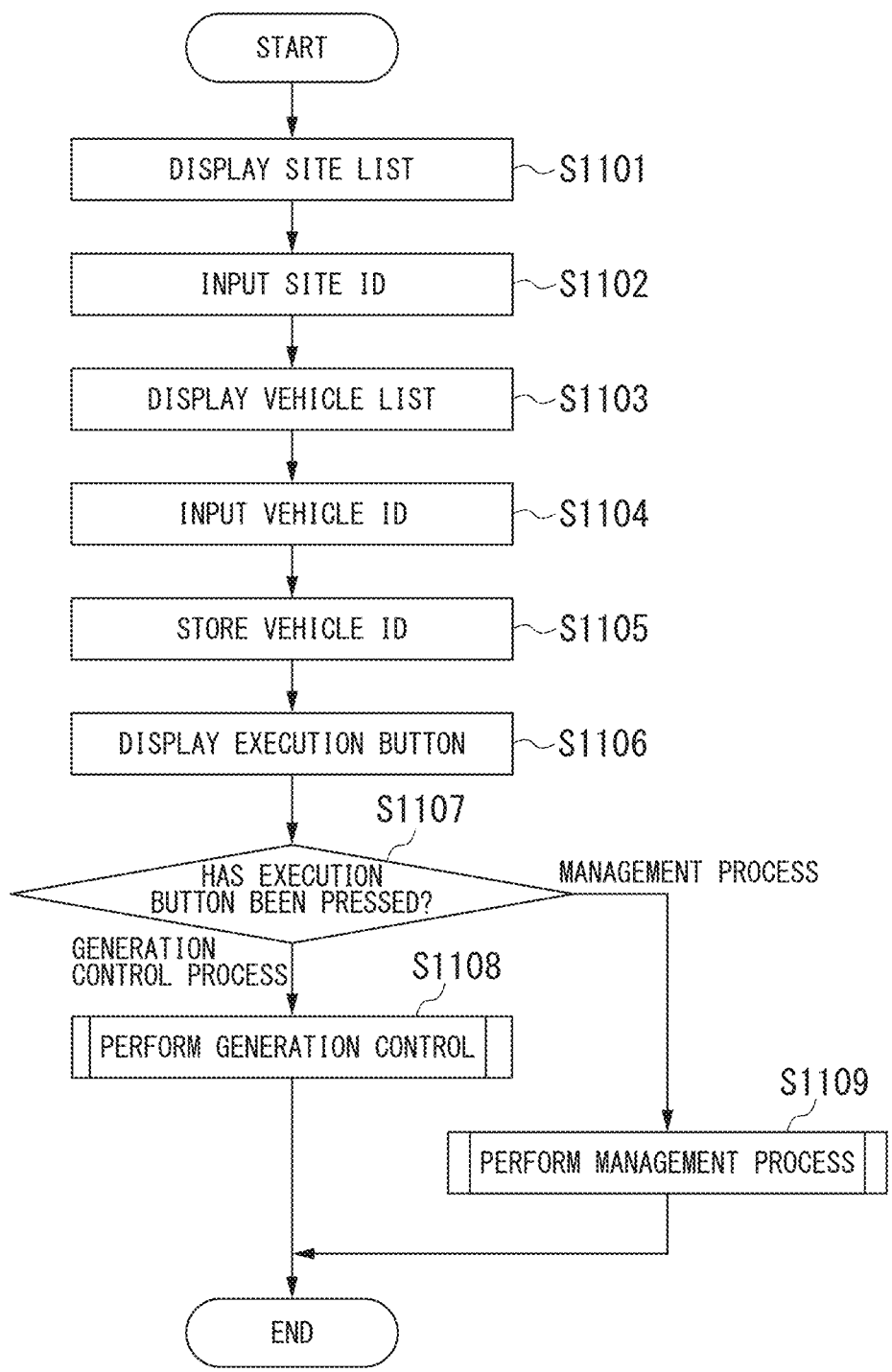
FIG. 16 is a flowchart illustrating the operation of the terminal device according to the second embodiment.

FIG. 16 is a flowchart illustrating the operation of the terminal device according to the second embodiment.

A driver D causes the terminal device 200 to execute an image-capturing control program used for performing an image-capturing method according to the second embodiment by operating the terminal device 200. When the terminal device 200 starts execution of the image-capturing control program, a display control unit 203 displays a list of construction sites stored by a vehicle list-storing unit 207 on a display (Step S1101). On the display, for example, a list representing construction sites using addresses of the construction sites is displayed. The input-receiving unit 204 accepts an input of selection of one site ID in the displayed list (Step S1102). The input-receiving unit 204 displays a list of construction machines 100 associated with an input site ID on the display (Step S1103). On the display, for example, a list representing construction machines 100 using a combination of a type and a serial number of each construction machine 100 is displayed. The input-receiving unit 204 receives an input of selection of one vehicle ID in the displayed list (Step S1104). The input-receiving unit 204 stores the input vehicle ID in a target vehicle-storing unit 205 (Step S1105). Accordingly, the terminal device 200 can determine a target vehicle without receiving a beacon signal.

When the input-receiving unit 204 stores a vehicle ID in the target vehicle-storing unit 205, the display control unit 203 displays an execution button of a generation control process of three-dimensional data and an execution button of a management process of three-dimensional data on the display (Step S1106). The input-receiving unit 204 accepts a pressing input of the execution button of the generation control process or the execution button of the management process that is displayed (Step S1107). In a case in which the execution button of the generation control process is pressed (Step S1107: generation control process), the terminal device 200 executes the generation control process of three-dimensional data (Step S1108). On the other hand, in a case in which the execution button of the management process is pressed (Step S1107: management process), the terminal device 200, similar to the first embodiment, executes display of data, integration of data, and reflection of data (the management process of three-dimensional data) in the order illustrated in FIG. 11 (Step S1109). In other words, a manager A selects data to be checked from the list displayed by the terminal device 200 in Step S312 and selects data reading in Step S314, whereby the data is transmitted from the server device 300 to the terminal device 200, and the data is displayed in the terminal device 200. Accordingly, the manager A can check whether or not three-dimensional data representing an appropriate range is generated using the control device 126 of the construction machine 100.

<<Operation and Effects>>

In this way, according to the second embodiment, the terminal device 200 accepts an input of selection of a vehicle ID in the list stored in advance, thereby determining a target vehicle. Accordingly, the terminal device 200 can determine a target vehicle without receiving a beacon signal. Accordingly, the manager A who is a photographer can check a capture range and a capture content captured by the stereo cameras 125 and cause the control device 126 to generate three-dimensional data relating to a desired place.

Modified Example

In the second embodiment, although the terminal device 200 displays the list stored by the vehicle list-storing unit 207, another embodiment is not limited thereto. For example, in another embodiment, the terminal device 200 may transmit a site ID of a construction site that is a target to the server device 300, and the server device 300 may transmit a list of construction machines 100 associated with the site ID from the site information-storing unit 309 to the terminal device 200. In other words, in a construction management system 1 according to another embodiment, after a manager A or a driver D is allowed to select a construction site that is a target among a plurality of construction sites, a construction machine 100 may be configured to be selected.

In addition, a terminal device 200 according to another embodiment may determine a construction machine 100, similar to the first embodiment, on the basis of a beacon signal in a case in which a beacon signal can be received and determine a construction machine 100, similar to the second embodiment, on the basis of a list in a case in which a beacon signal cannot be received.

Third Embodiment

<<Construction Management System>>

In the construction management system 1 according to the first embodiment, the construction machine 100 and the terminal device 200 transmit and receive instructions and data through the server device 300. On the other hand, in a construction management system 1 according to a third embodiment, in a generation control process of three-dimensional data, a construction machine 100 and a terminal device 200 transmit and receive instructions and data via direct communication and not through a server device 300. The terminal device 200 is operated by a manager A or a driver D.

<<Operation>>

Figure 17:
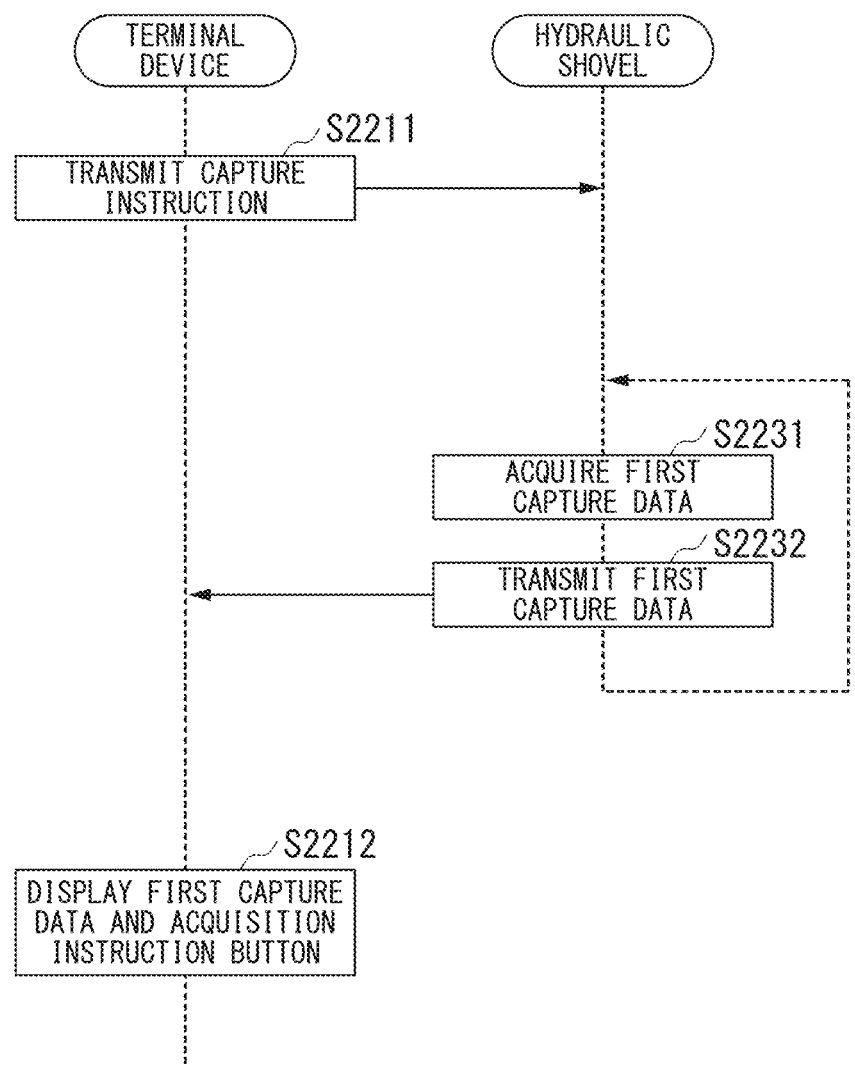
FIG. 17 is a first sequence diagram illustrating a three-dimensional data generation control process according to a third embodiment.

FIG. 17 is a first sequence diagram illustrating a three-dimensional data generation control process according to the third embodiment.

When the terminal device 200 starts a three-dimensional data generation control process in Step S106, an instruction-transmitting unit 206 transmits a capture instruction to a construction machine 100 represented by a vehicle ID stored by a target vehicle-storing unit 205 using near-field communication (Step S2211). Examples of the near-field communication include a wireless local area network (LAN), Bluetooth (registered trademark), and near-field radio communication (NFC) that can be used by a driver D or a manager A without having special authentication or licenses. When an instruction-receiving unit 1262 of the construction machine 100 receives a capture instruction from the terminal device 200, a capture data-acquiring unit 1263 acquires capture data (first capture data) from a first camera 1251 (Step S2231). A data-transmitting unit 1266 transmits the first capture data acquired by the capture data-acquiring unit 1263 to the terminal device 200 that is a transmission source of the capture instruction (Step S2232). In addition, in another embodiment, a vehicle ID that is vehicle identification information assigned to each construction machine 100 may be stored in a predetermined storage device of the construction machine 100, and the data-transmitting unit 1266 may read a vehicle ID from the predetermined storage device and transmit the vehicle ID to the terminal device 200 together with the first capture data. In such a case, a target vehicle-storing unit 205 of the terminal device 200 stores the received vehicle ID.

When the capture instruction executed in Step S2211 described above is issued, a vehicle ID acquired in the past may be selected from the target vehicle-storing unit 205 of the terminal device 200, and a capture instruction may be transmitted to a construction machine 100 corresponding to the selected vehicle ID. Hereinafter, until a connection with the terminal device 200 is cut off, the construction machine 100 executes acquisition and transmission of the first capture data every time when a predetermined time (for example, five seconds) elapses. When a data-receiving unit 202 of the terminal device 200 receives the first capture data, a display control unit 203 displays a capture range-checking screen including a transmission button for an acquisition instruction and the received first capture data on a display (Step S2212).

FIG. 18 is a second sequence diagram illustrating the three-dimensional data generation control process according to the third embodiment.

After the terminal device 200 displays a transmission button for an acquisition instruction, when a driver D presses the transmission button, the instruction-transmitting unit 206 transmits an acquisition instruction to a construction machine 100 represented by a vehicle ID stored by the target vehicle-storing unit 205 (Step S2213). When the instruction-receiving unit 1262 of the construction machine 100 receives the acquisition instruction, the capture data-acquiring unit 1263 acquires capture data (second capture data)

from all the cameras of stereo camera 125 (Step S2233). The vehicle information-acquiring unit 1264 acquires vehicle information such as position information, azimuth information, and posture information from the position detector 122, the azimuth detector 123, and the posture detector 124 (Step S2234). The three-dimensional data-generating unit 1265 generates three-dimensional data of a capture range according to the stereo cameras 125 on the basis of the second capture data, the position information, the azimuth information, and the posture information that have been acquired (Step S2235).

The data-transmitting unit 1266 transmits the generated three-dimensional data and the second capture data to the server device 300 (Step S2236). When the data-receiving unit 304 of the server device 300 receives the three-dimensional data and the second capture data, the three-dimensional data and the second capture data are stored in the data-storing unit 305 (Step S2226).

In addition, the terminal device 200, similar to the first embodiment, in accordance with the order illustrated in FIG. 11 can execute display of data, integration of data, and reflection of data (management process of three-dimensional data). In other words, a manager A or a driver D selects data to be checked from a list displayed by the terminal device 200 in Step S312 and selects data reading in Step S314, whereby the data is transmitted from the server device 300 to the terminal device 200, and the data is displayed in the terminal device 200. Accordingly, the manager A or the driver D can check whether or not three-dimensional data representing an appropriate range is generated using the control device 126 of the construction machine 100.

<<Operation and Effects>>

In this way, according to the third embodiment, the terminal device 200 communicates with the construction machine 100 using near-field communication. Accordingly, a response time in communication between the terminal device 200 and the construction machine 100 can be shortened to be lower than that of a case communication is executed through the network N and the server device 300. In addition, also in the third embodiment, the manager A or the driver D who is a photographer can check a capture range and a capture content captured by the stereo cameras 125 and cause the control device 126 to generate three-dimensional data relating to a desired place.

Fourth Embodiment

The terminal device 200 according to the third embodiment is connected to the construction machine 100 through near-field communication. On the other hand, a construction machine 100 according to a fourth embodiment includes a terminal device 200, and the terminal device 200 and a control device 126 are connected using wires. The terminal device 200 is installed on the side in front (+Y direction) of a seat inside a driving compartment 121. Accordingly, a driver D can check the terminal device 200 while driving the construction machine 100.

The control device 126 according to the fourth embodiment may not include the beacon-transmitting unit 1261. The terminal device 200 according to the fourth embodiment may not include the beacon-receiving unit 201 and the target vehicle-storing unit 205. The target vehicle of the terminal device 200 according to the fourth embodiment is a construction machine 100 in which the terminal device 200 is always mounted.

Fifth Embodiment

The construction machine 100 according to the first embodiment acquires second capture data from the stereo cameras 125 when an acquisition instruction is received. On the other hand, a construction machine 100 according to a fifth embodiment acquires first capture data to be used as second capture data from among a plurality of pieces of stored first capture data.

Figure 19:
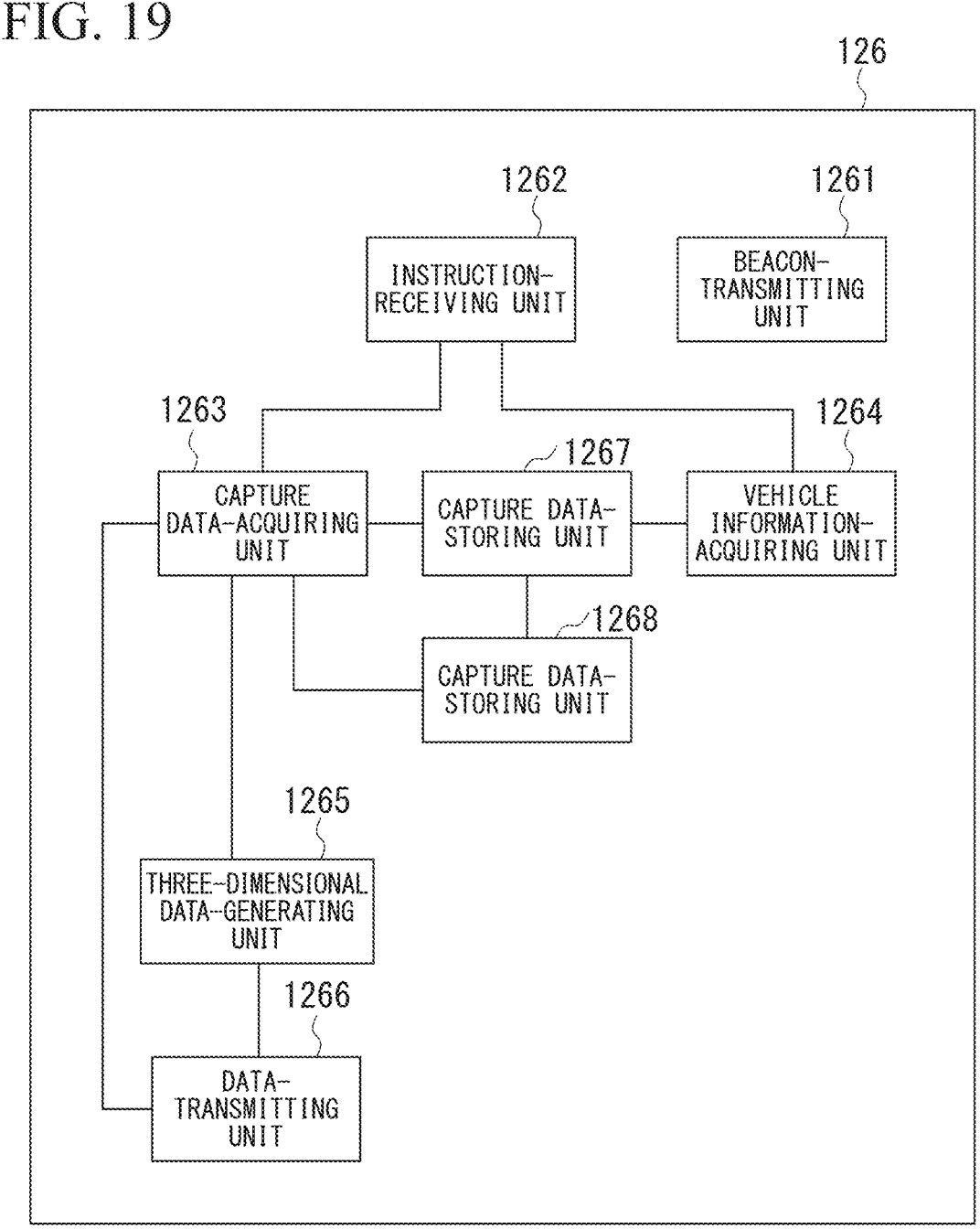
FIG. 19 is a schematic block diagram illustrating the configuration of a control device of a construction machine according to a fifth embodiment.

FIG. 19 is a schematic block diagram illustrating the configuration of a control device of a construction machine according to the fifth embodiment.

The control device 126 of the construction machine 100 according to the fifth embodiment further includes a capture data-recording unit 1267 and a capture data-storing unit 1268 in addition to the components according to the first embodiment. The capture data-recording unit 1267 stores first capture data acquired by the capture data-acquiring unit 1263 from the stereo camera 125, capture ID as image identification information used for determining the first capture data, and vehicle information acquired by the vehicle information-acquiring unit 1264 in the capture data-storing unit 1268 in association with each other. Example of a capture ID includes capture date and time and a serial number.

Figure 20:
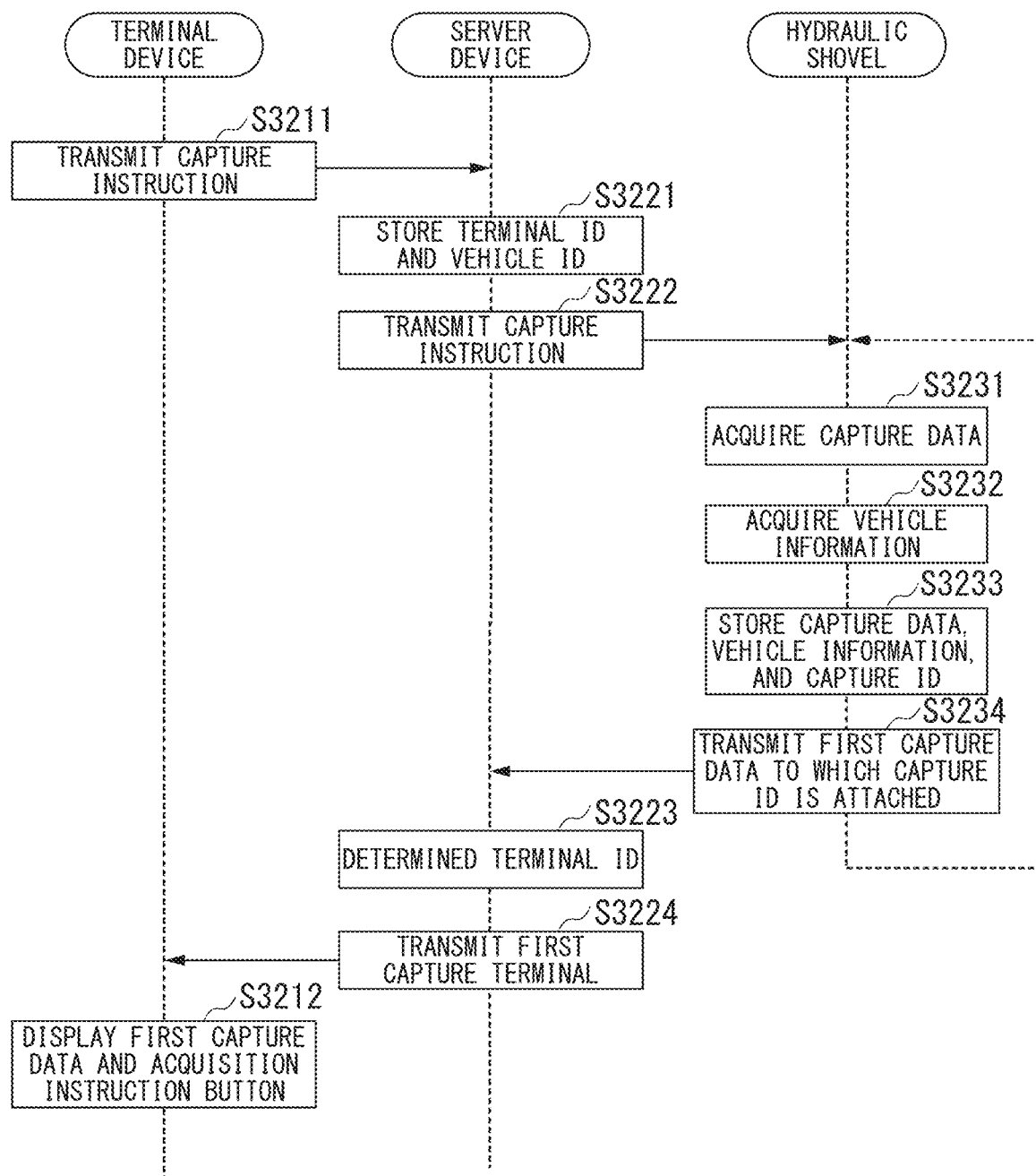
FIG. 20 is a first sequence diagram illustrating a three-dimensional data generation control process according to the fifth embodiment.

FIG. 20 is a first sequence diagram illustrating a three-dimensional data generation control process according to the fifth embodiment.

When the terminal device 200 starts a three-dimensional data generation control process in Step S106 illustrated in FIG. 6, the instruction-transmitting unit 206 transmits a capture instruction including a vehicle ID stored by the target vehicle-storing unit 205 to the server device 300 (Step S3211). When the capture instruction is received from the terminal device 200, the instruction-transmitting unit 301 of the server device 300 stores a vehicle ID included in the capture instruction and a terminal ID representing the terminal device 200 that is a transmission source of the capture instruction in the connection relation-storing unit 302 in association with each other (Step S3221). Next, the instruction-transmitting unit 301 transmits the received capture instruction to a construction machine 100 represented by a vehicle ID included in the capture instruction (Step S3222).

When the instruction-receiving unit 1262 of the construction machine 100 receives a capture instruction from the server device 300, the capture data-acquiring unit 1263 acquires capture data from all the cameras (the first camera 1251, the second camera 1252, the third camera 1253, and the fourth camera 1254) of the stereo cameras 125 (Step S3231). The vehicle information-acquiring unit 1264 acquires vehicle information such as position information, azimuth information, and posture information from the position detector 122, the azimuth detector 123, and the posture detector 124 (Step S3232). The capture data-recording unit 1267 stores the capture data and the vehicle information that have been acquired in the capture data-storing unit 1268 in association with a capture ID (Step S3233). The data-transmitting unit 308 transmits capture data (first capture data) captured by the first camera 1251 among capture data to which the capture ID is assigned to the server device 300 (Step S3234).

When the first capture data is received from the construction machine 100, the data-transmitting unit 303 of the server device 300 determines a terminal ID associated with a vehicle ID of the construction machine 100 that is a transmission source of the first capture data in the connection relation-storing unit 302 illustrated in FIG. 5 (Step S3223). The data-transmitting unit 303 transmits first capture data to a terminal device 200 represented by the determined terminal ID (Step S3224). When the data-receiving unit 202 of the terminal device 200 receives the first capture data, the display control unit 203 displays a capture range-checking screen including a transmission button B3 for transmitting an acquisition instruction to the construction machine 100 and the received first capture data on the display (Step S3212).

Figure 21:
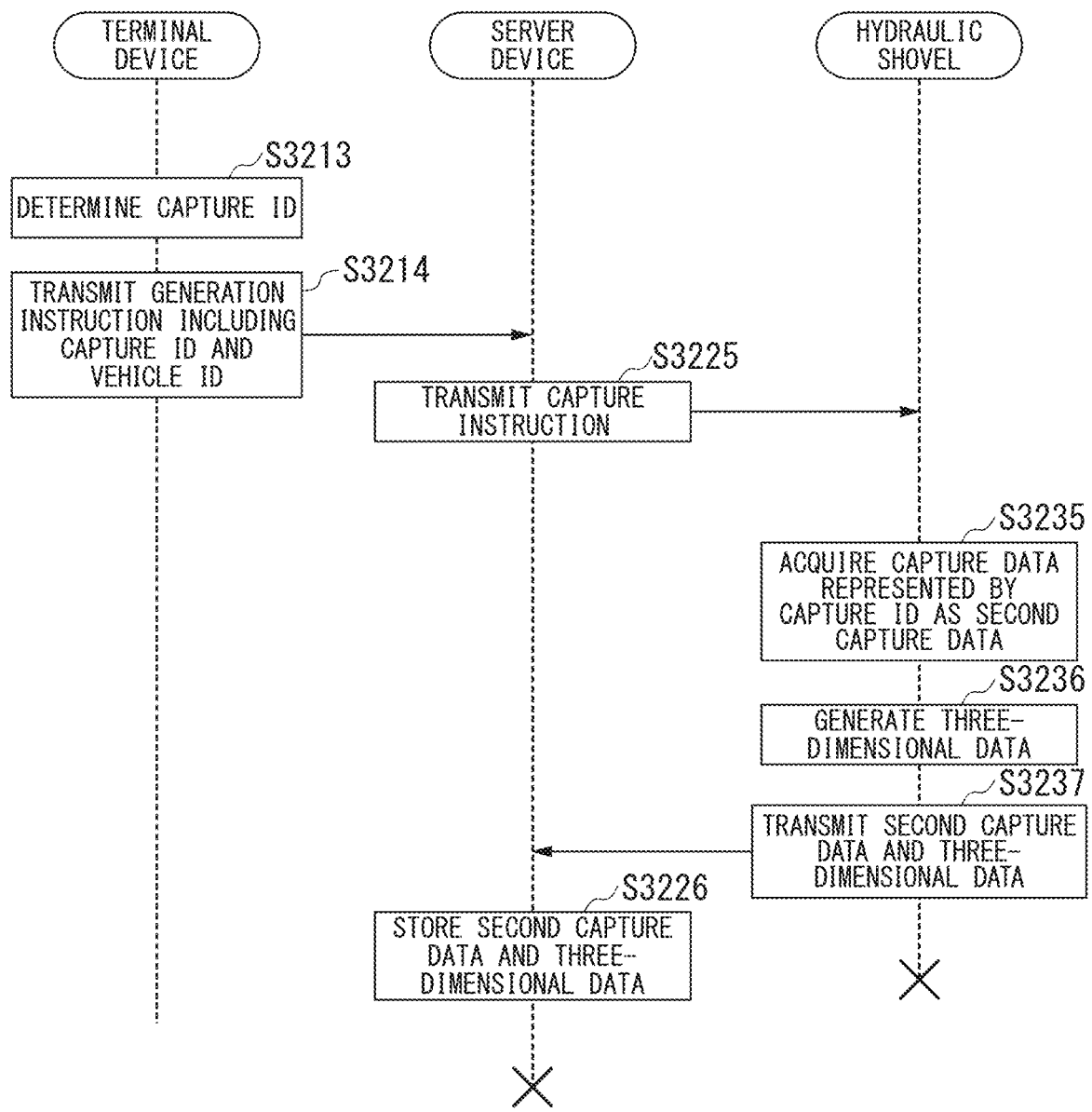
FIG. 21 is a second sequence diagram illustrating a three-dimensional data generation control process according to the fifth embodiment.

FIG. 21 is a second sequence diagram illustrating a three-dimensional data generation control process according to the fifth embodiment.

After the terminal device 200 displays the transmission button B3, when a driver D presses the transmission button B3, the instruction-transmitting unit 206 determines a capture ID attached to the first capture data latest received by the data-receiving unit 202 (Step S3213). Accordingly, a capture ID of the first capture data displayed on the display when the transmission button B3 is pressed can be determined. The instruction-transmitting unit 206 transmits an acquisition instruction of the second capture data to the server device 300 (Step S3214). In the acquisition instruction, the determined capture ID and the vehicle ID stored by the target vehicle-storing unit 205 are included. The instruction-transmitting unit 301 of the server device 300 transmits the received acquisition instruction to a construction machine 100 represented by the vehicle ID included in the acquisition instruction (Step S3225).

When the instruction-receiving unit 1262 of the construction machine 100 receives an acquisition instruction, the capture data-acquiring unit 1263 extracts the first capture data associated with the capture ID included in the acquisition instruction and capture data captured by the second camera 1252, the third camera 1253, and the fourth camera 1254 at the same timing as that of the first capture data from the capture data-storing unit 1268 and acquires the capture data as second capture data (Step S3235). In addition, the capture data-acquiring unit 1263 acquires vehicle information associated with the capture ID included in the acquisition instruction from the capture data-storing unit 1268. The three-dimensional data-generating unit 1265 generates three-dimensional data of a capture range according to the stereo cameras 125 on the basis of the second capture data and the vehicle information that have been acquired (Step S3236).

The data-transmitting unit 1266 transmits the generated three-dimensional data and the second capture data to the server device 300 (Step S3237). When three-dimensional data and second capture data are received, the data-receiving unit 304 of the server device 300 stores the three-dimensional data and the second capture data in the data-storing unit 305 (Step S3226).

Accordingly, the terminal device 200 can transmit the acquisition instruction for acquiring capture data displayed when the driver D presses the transmission button B3 to the construction machine 100.

Other Embodiments

While the embodiments have been described above in detail with reference to the drawings, a specific configuration is not limited to that described above, and various design changes and the like can be made.

For example, in a capture instruction transmitted by the terminal device 200 according to the embodiment described above, although a terminal ID of the transmission source is included, the capture instruction is not limited thereto. For example, in a capture instruction according to another embodiment, a terminal ID representing a device other than the terminal device 200 may be included as a terminal ID of a transmission destination of capture data. In other words, a terminal device 200 transmitting a capture instruction and a terminal device 200 that receives capture data and displays the capture data may be different from each other.

Although the construction machine 100 according to the embodiment described above, when a capture instruction is received, transmits the capture data when a predetermined time elapses, the operation is not limited thereto. For example, a construction machine 100 according to another embodiment, when a capture instruction is received, may start streaming transmission of capture data captured by the first camera 1251. In other words, a construction machine 100 according to another embodiment may transmit capture data as a moving image.

Although the construction machine 100 according to the embodiment described above includes the stereo cameras 125 as image-capturing devices that can acquire information of the depth direction, the image-capturing device is not limited thereto. For example, the construction machine 100 according to another embodiment may include a 3D scanner, a depth sensor, or any other image-capturing device as an image-capturing device that can acquire information of the depth direction.

Although the construction machine 100 according to the embodiment described above, when a capture instruction is received, executes transmission of capture data captured by the first cameras 1251, the transmission is not limited thereto. For example, a construction machine 100 according to another embodiment, when a capture instruction is received, may transmit capture data captured by the second camera 1252, capture data captured by the third camera 1253, or capture data captured by the fourth camera 1254. In addition, for example, a construction machine 100 according to another embodiment, when a capture instruction is received, may transmit capture data captured by two or more cameras among the first camera 1251, the second camera 1252, the third camera 1253, and the fourth camera 1254.

Although the control device 126 of the construction machine 100 according to the embodiment described above, when a capture instruction is received, generates three-dimensional data by acquiring capture data from the stereo cameras 125, the generation of three-dimensional data is not limited thereto. For example, in a construction management system 1 according to another embodiment, a construction machine 100 may transmit capture data acquired from the stereo cameras 125 and vehicle information acquired by the vehicle information-acquiring unit 1264 to a server device 300, and the server device 300 may generate three-dimensional data from the capture data. In other words, a construction machine 100 according to another embodiment may not include the three-dimensional data-generating unit 1265.

Although the construction machine 100 according to the embodiment described above includes the beacon-transmitting unit 1261 as the function of the control device 126, the configuration is not limited thereto. For example, a construction machine 100 according to another embodiment may include a signal transmitter that is separate from the control device 126 as the beacon-transmitting unit 1261.

Although the construction machine 100 according to the embodiment described above is a hydraulic shovel as a work vehicle, the work vehicle is not limited thereto. For example, a construction machine 100 according to another embodiment may be a wheel loader, a bulldozer, a motor grader, a dump truck, or any other construction machine as a work vehicle.

Although the terminal device 200 according to the embodiment described above accepts a pressing-down input of the transmission button of an acquisition instruction while capture data is displayed, the acceptance of the input is not limited thereto. For example, the terminal device 200 according to another embodiment may accept a pressing-down input of the transmission button of an acquisition instruction after erasing the display of capture data from the display. Also in this case, a driver D may transmit an acquisition instruction after checking the capture range.

Although the terminal device 200 according to the embodiment described above accepts a pressing-down input of the transmission button of an acquisition instruction after capture data is displayed, the process is not limited thereto. For example, a terminal device 200 according to another embodiment may continuously transmit an acquisition instruction while capture data is displayed.

Also in this case, a driver D can check the capture range of capture data used for generation of three-dimensional data.

Although the terminal device 200 according to the embodiment described above receives three-dimensional data and displays the received three-dimensional data on the display, the display is not limited thereto. For example, in another embodiment, the terminal device 200 may not have a function of displaying three-dimensional data. In such a case, three-dimensional data generated in accordance with an operation of the terminal device 200 is checked using another device.

Although the terminal device 200 according to the embodiment described above displays a frame representing a range used for the generation of three-dimensional data as measuring range information on the display together with the capture data, the display is not limited thereto. For example, a terminal device 200 according to another embodiment may perform trimming of capture data in a range used for the generation of three-dimensional data and display the trimmed capture data on the display. In addition, for example, the color of capture data may be configured to be different inside and outside the range used for the generation of three-dimensional data. Furthermore, in another embodiment, a text of "measuring range" may be displayed in the frame. In addition, in another embodiment, a terminal device 200 may not display the range used for the generation of three-dimensional data.

In the terminal device 200 according to the embodiment described above, although a transmission trigger of a capture instruction, an acquisition instruction, a transmission instruction, an integration instruction, and a reflection instruction is pressing-down of the transmission button, the transmission trigger is not limited thereto. For example, a transmission trigger according to another embodiment may be a predetermined speech input, detection of an acceleration of a predetermined value or more, reception of an electric wave, or any other trigger. In addition, in another embodiment, a transmission trigger of an acquisition instruction may not be a process for the terminal device 200 but pressing of a capture button disposed inside the driving compartment 121 of the construction machine 100. In other words, in another embodiment, a driver D may acquire second capture data by pressing the button of the construction machine 100 after visually recognizing the first capture data displayed in the terminal device 200.

Although the server device 300 according to the embodiment described above transmits first capture data to a terminal device 200 represented by a terminal ID stored in the connection relation-storing unit 302 associated with the vehicle ID that is a transmission source of the first capture data, the transmission is not limited thereto. For example, a server device 300 according to another embodiment may transmit first capture data to a terminal device 200 represented by a terminal ID attached to the first capture data received from the construction machine 100. In such a case, the server device 300 transmits a capture instruction including the terminal ID that is a transmission source to the construction machine 100. In addition, in this case, the control device 126 of the construction machine 100 assigns the terminal ID included in the capture instruction to the first capture data and transmits resultant data to the server device 300.

The server device 300 according to the embodiment described above transmits capture data captured by the construction machine 100 associated with the terminal device 200 and a list of three-dimensional data, the operation is not limited thereto. For example, a server device 300 according to another embodiment may transmit a list of capture data captured by the construction machine 100 associated with the same construction site as that of the construction machine 100 associated with the terminal device 200 and three-dimensional data. More specifically, the server device 300 may determine a vehicle ID associated with the same site ID as that of the vehicle ID included in the transmission instruction received from the terminal device 200 from the site information-storing unit 309 and transmit a list of data stored by the data-storing unit 305 in association with the vehicle ID to the terminal device 200. In such a case, the construction management system 1 may execute data reading, data integration, and reflection on the construction progress information in units of construction sites.

<Computer Configuration>

Figure 22:
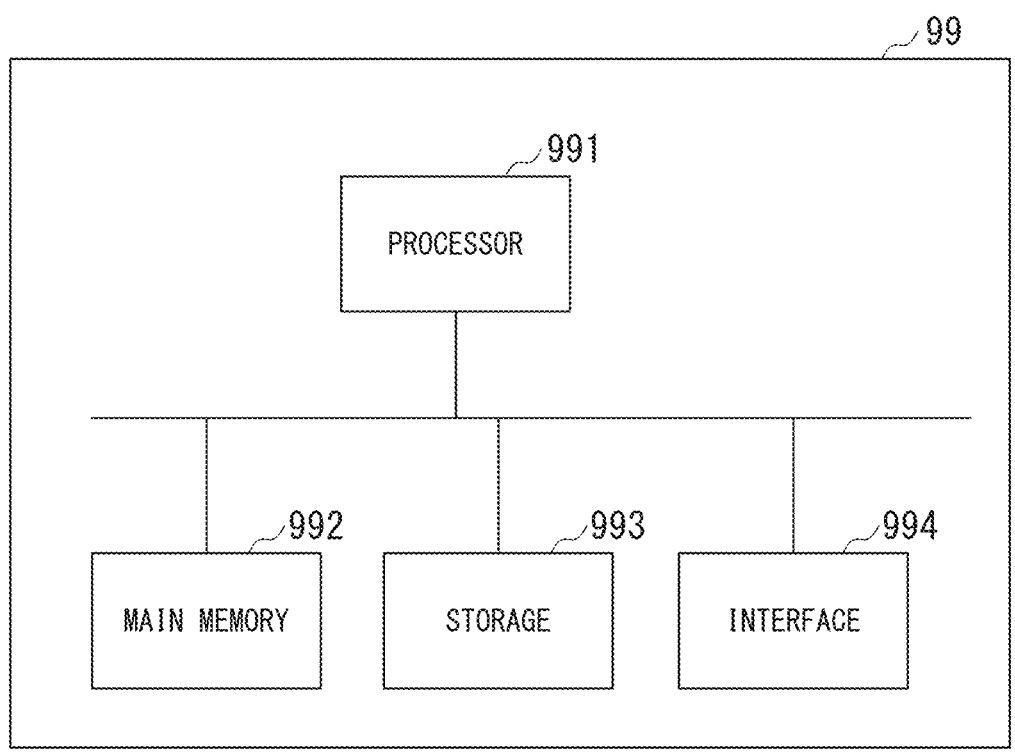
FIG. 22 is a schematic block diagram illustrating the configuration of a computer according to at least one embodiment.

FIG. 22 is a schematic block diagram illustrating the configuration of a computer according to at least one embodiment.

The computer 99 includes a processor 991, a main memory 992, a storage 993, and an interface 994.

The control device 126, the terminal device 200, and the server device 300 according to the embodiment described above include the computer 99. The function of each processing unit described above is stored in the storage 993 as a program. The processor 991 reads a program from the storage 993, expands the program into the main memory 992, and executes the process described above in accordance with the program.

The processor 991 secures a storage area corresponding to each storage unit described above in the main memory 992 in accordance with the program. The storage 993 is one example of a medium of a non-transitory form. Other examples of the medium of a non-transitory form include an optical disc, a magnetic disk, magneto-optical disk, and a semiconductor memory connected through the interface 994.

A program may be distributed to the computer 99 through a network. In such a case, the computer 99 expands the distributed program into the main memory 992 and executes the process described above. A program may be used for realizing some of the functions described above.

For example, a program may realize the functions described above by being combined with another program stored in the storage 993 in advance or being combined with another program mounted in another device. In addition, some of the functions described above may be executed by another device connected through a network. In other words, the functions described above may be realized using cloud computing, grid computing, clustering computing, or any other parallel computing.

The computer 99 may include a programmable logic device (PLD) in addition to the configuration described above or instead of the configuration described above. Examples of the PLD include a programmable array logic (PAL), a generic array logic (GAL), a complex programmable logic device (CPLD), or a field programmable gate array (FPGA).

INDUSTRIAL APPLICABILITY

According to at least one aspect among the aspects described above, a terminal device, a control device, a data-integrating device, a work vehicle, an image-capturing system, and an image-capturing method capable of generating three-dimensional data relating to a desired place are provided.

REFERENCE SIGNS LIST

1 Construction management system
100 Construction machine
125 Stereo camera
126 Control device
1261 Beacon-transmitting unit
1262 Instruction-receiving unit
1263 Capture data-acquiring unit
1264 Vehicle information-acquiring unit
1265 Three-dimensional data-generating unit
1266 Data-transmitting unit
200 Terminal device
201 Beacon-receiving unit
202 Data-receiving unit
203 Display control unit
204 Input-receiving unit
205 Target vehicle-storing unit
206 Instruction-transmitting unit

The invention claimed is:

1. A terminal device, comprising:
a capture data-receiving unit receiving first capture data at repeated time intervals captured by an individual image-capturing device, which is included in a work vehicle, capable of generating three-dimensional data;
a display unit displaying the first capture data at repeated time intervals received by the capture data-receiving unit; and
an acquisition instruction-transmitting unit transmitting an acquisition instruction for causing the work vehicle to acquire second capture data captured by a plurality of image-capturing devices included in the work vehicle and used for generation of three-dimensional data, in response to an evaluation of the first capture data displayed on the display unit,
wherein the evaluation comprises determining whether a time width between an oldest capture time of the first capture data and a newest capture time of the second capture data is less than a predetermined time.

2. The terminal device according to claim 1, further comprising:
an input-receiving unit accepting an input of a transmission trigger of an acquisition instruction after the first capture data is displayed,
wherein the acquisition instruction-transmitting unit transmits the acquisition instruction when the transmission trigger is input.

3. The terminal device according to claim 2, further comprising:
a capture instruction-transmitting unit transmitting a capture instruction including identification information of a work vehicle,
wherein the capture data-receiving unit receives the first capture data from the work vehicle represented by the identification information included in the capture instruction.

4. The terminal device according to claim 2, further comprising:
a three-dimensional data-receiving unit receiving three-dimensional data generated on the basis of capture data captured by the image-capturing device,
wherein the display unit displays the three-dimensional data received by the three-dimensional data-receiving unit.

5. The terminal device according to claim 1, further comprising:
a capture instruction-transmitting unit transmitting a capture instruction including identification information of a work vehicle,
wherein the capture data-receiving unit receives the first capture data from the work vehicle represented by the identification information included in the capture instruction.

6. The terminal device according to claim 1, further comprising:
a three-dimensional data-receiving unit receiving three-dimensional data generated on the basis of capture data captured by the image-capturing device,
wherein the display unit displays the three-dimensional data received by the three-dimensional data-receiving unit.

7. The terminal device according to claim 1, wherein the display unit displays measuring range information representing a range used for generation of the three-dimensional data together with the first capture data.

8. The terminal device according to claim 1,
wherein the image-capturing device is a plurality of image-capturing devices, and
wherein the first capture data is capture data captured by one image-capturing device among the plurality of image-capturing devices.

9. The terminal device according to claim 1,
wherein the display unit includes display of a frame representing an overlapping portion of captured areas of the image-capturing device and of a second image-capturing device in the work vehicle, and
the acquisition instruction-transmitting unit transmitting an acquisition instruction for causing the work vehicle to acquire second capture data captured by the image-capturing device and the second image-capturing device and used for generation of three-dimensional data.

10. An image-capturing system, comprising:
a work vehicle; and
a terminal device,
wherein the work vehicle includes:
a vehicle body;
an image-capturing device comprising a plurality of image-capturing devices including an individual image capturing device included in the vehicle body and being capable of acquiring information of a depth direction;
a capture data-transmitting unit transmitting first capture data at repeated time intervals captured by the individual image-capturing device to the terminal device;

an acquisition instruction-receiving unit receiving an acquisition instruction of second capture data used for generation of three-dimensional data; and a capture data-acquiring unit acquiring the second capture data from the plurality of image-capturing devices in accordance with the acquisition instruction, and wherein the terminal device includes:

a capture data-receiving unit receiving the first capture data at repeated time intervals captured by the individual image-capturing device from the work vehicle;

a display unit displaying the first capture data at repeated time intervals received by the capture data-receiving unit; and an acquisition instruction-transmitting unit transmitting an acquisition instruction for causing the work vehicle to acquire the second capture data captured by the plurality of image-capturing devices included in the work vehicle, in response to an evaluation of the first capture data displayed on the display unit, wherein the evaluation comprises determining whether a time width between an oldest capture time of the first capture data and a newest capture time of the second capture data is less than a predetermined time.

11. The image-capturing system according to claim 10, wherein the work vehicle further includes a three-dimensional data-generating unit generating three-dimensional data using the second capture data.

12. An image-capturing method, comprising:

receiving first capture data at repeated time intervals captured by an individual image-capturing device included in a work vehicle and being capable of acquiring information of a depth direction;

displaying the received first capture data at repeated time intervals in a terminal device; and transmitting an acquisition instruction causing the work vehicle to acquire second capture data captured by a plurality of image-capturing devices included in the work vehicle and used for generation of three-dimensional data, in response to an evaluation of the first capture data displayed in the terminal device, wherein the evaluation comprises determining whether a time width between an oldest capture time of the first capture data and a newest capture time of the second capture data is less than a predetermined time.

13. A control device, comprising:

a capture data-transmitting unit transmitting first capture data at repeated time intervals captured by an individual image-capturing device included in a work vehicle and being capable of acquiring information of a depth direction to a terminal device;

an acquisition instruction-receiving unit receiving an acquisition instruction of second capture data used for generation of three-dimensional data; and a capture data-acquiring unit acquiring the second capture data from a plurality of image-capturing devices in accordance with the acquisition instruction, used for generation of three-dimensional data, in response to an evaluation of the first capture data displayed in the terminal device, wherein the evaluation comprises determining whether a time width between an oldest capture time of the first capture data and a newest capture time of the second capture data is less than a predetermined time.

14. A data-integrating device, comprising:

a three-dimensional data-acquiring unit acquiring a plurality of pieces of three-dimensional data generated on the basis of capture data acquired by performing image-capturing of a construction site using an image-capturing device included in a work vehicle, each of the plurality of pieces of three-dimensional data associated with an indication of a capture time at which the image of the respective piece of three-dimensional data was captured;

an instruction receiving unit receiving an integration instruction selecting a portion of the plurality of pieces of three-dimensional data for integration; and a three-dimensional data-integrating unit determining whether a time width between an oldest capture time and a newest capture time of the selected portion of the plurality of pieces of three-dimensional data is less than a predetermined time, and generating integrated three-dimensional data when the time width is less than the predetermined time by integrating the selected portion of the plurality of pieces of three-dimensional data acquired by the three-dimensional data-acquiring unit.

15. The data-integrating device according to claim 14, wherein, in a case in which a plurality of pieces of common three-dimensional data that are a plurality of pieces of three-dimensional data having height information for the same plane coordinates are included in the plurality of pieces of three-dimensional data, the three-dimensional data-integrating unit calculates an average value of heights relating to the plane coordinates in the common three-dimensional data and generates the integrated three-dimensional data using the average value.

16. The data-integrating device according to claim 15, wherein the three-dimensional data-integrating unit generates the integrated three-dimensional data by integrating the plurality of pieces of three-dimensional data generated on the basis of the capture data captured by the image-capturing devices included in a plurality of work vehicles.

17. The data-integrating device according to claim 14, wherein, in a case in which a plurality of pieces of common three-dimensional data that are a plurality of pieces of three-dimensional data having height information for the same plane coordinates are included in the plurality of pieces of three-dimensional data, the three-dimensional data-integrating unit generates the integrated three-dimensional data using a height relating to the newest-common three-dimensional data among the plurality of pieces of common three-dimensional data.

18. The data-integrating device according to claim 14, wherein the three-dimensional data-integrating unit generates the integrated three-dimensional data by integrating the plurality of pieces of three-dimensional data generated on the basis of the capture data captured by the image-capturing devices included in a plurality of work vehicles.

19. A work vehicle, comprising:

a vehicle body;

an image-capturing device included in the vehicle body;

a three-dimensional data-generating unit generating a plurality of pieces of three-dimensional data on the basis of a plurality of pieces of capture data captured by the image-capturing device, each of the plurality of pieces of three-dimensional data associated with an indication of a capture time at which the image of the respective piece of three-dimensional data was captured; and a three-dimensional data-integrating unit determining whether a time width between an oldest capture time and a newest capture time of the plurality of pieces of three-dimensional data is less than a predetermined time, and generating integrated three-dimensional data when the time width is less than the predetermined time by integrating a plurality of pieces of three-dimensional data generated by the three-dimensional data-generating unit.

20. An image-capturing system, comprising:
a work vehicle; and
a data-integrating device,
wherein the work vehicle includes:
a vehicle body;
an image-capturing device included in the vehicle body;
a three-dimensional data-generating unit generating a plurality of pieces of three-dimensional data on the basis of a plurality of pieces of capture data captured by the image-capturing device, each of the plurality of pieces of three-dimensional data associated with an indication of a capture time at which the image of the respective piece of three-dimensional data was captured; and
a data-transmitting unit transmitting the plurality of pieces of three-dimensional data to the data-integrating device, and
wherein the data-integrating device includes:
a data-receiving unit receiving the plurality of pieces of three-dimensional data from the work vehicle; and
a three-dimensional data-integrating unit determining whether a time width between an oldest capture time and a newest capture time of the plurality of pieces of three-dimensional data is less than a predetermined time, and generating integrated three-dimensional data when the time width is less than the predetermined time by integrating the plurality of pieces of three-dimensional data received by the data-receiving unit.

* * * * *